US012782704B2

(12) United States Patent
Lapid et al.

(10) Patent No.: US 12,782,704 B2
(45) Date of Patent: Nov. 3, 2026

(54) AUTO FOCUS SYSTEM HAVING A SPLITTER

(71) Applicant: Applied Materials Israel Ltd., Rehovot (IL)

(72) Inventors: Menachem Lapid, Rehovot (IL); Itay Langstadter, Rehovot (IL); Roy Kaner, Rehovot (IL); Roman Naidis, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 239 days.

(21) Appl. No.: 18/762,574

(22) Filed: Jul. 2, 2024

(65) Prior Publication Data

US 2026/0009993 A1 Jan. 8, 2026

(51) Int. Cl.
*G02B 21/20* (2006.01)
*G01N 21/95* (2006.01)
*G02B 21/06* (2006.01)

(52) U.S. Cl.
CPC ............. *G02B 21/20* (2013.01); *G02B 21/06* (2013.01); *G01N 21/9501* (2013.01)

(58) Field of Classification Search
CPC .......... G02B 21/20; G02B 21/06; G02B 7/34; G02B 7/343; G02B 7/346; G01N 21/9501;
(Continued)

(56) References Cited

U.S. PATENT DOCUMENTS 4,639,587 A * 1/1987 Chadwick ............ G02B 21/241
250/201.3
6,396,627 B1 5/2002 Tachihara et al.
(Continued)

FOREIGN PATENT DOCUMENTS

JP H0611660 A * 1/1994 ........... G02B 26/106

OTHER PUBLICATIONS

U.S. Appl. No. 18/762,546 , Final Office Action, Mailed On Mar. 13, 2026, 12 pages.
(Continued)

*Primary Examiner* — Collin X Beatty
(74) *Attorney, Agent, or Firm* — Kilpatrick Townsend & Stockton LLP

(57) ABSTRACT

An auto-focus system that includes (a) an illumination path that is configured to illuminate a sample with illumination beams that form multiple spot arrays on the sample that includes an upstream set of spot arrays formed on a first side of an imaging area, and a downstream set of spot arrays formed on another side of the imaging area; (b) a mask that is located at an entrance pupil, the mask comprises a pair of off-axis slits for truncating each collected beam to provide a pair of rays per each collected beam; and (c) a splitter that includes (i) a first reflecting facet that is configured to direct to the first branch, first rays associated with the first collected beams, and (ii) a second reflecting facet that is oriented to the first reflecting facet and is configured to direct to the second branch, rays associated with the second collected beams; wherein the first reflecting facet and the second reflecting facet are located at a reflecting facets location that is outside an image plain, and is located in a location in which there is a separation between the first rays and the second rays.

14 Claims, 22 Drawing Sheets

(58) Field of Classification Search
CPC ............. G01N 21/8806; G01N 21/956; G01N 21/8851; G01N 2021/8809; G03B 15/02; H04N 23/671
See application file for complete search history.

(56) References Cited

U.S. PATENT DOCUMENTS

| | | | | |
|---|---|---|---|---|
| 7,113,817 | B1 | 9/2006 | Winchester et al. | |
| 7,973,921 | B2 | 7/2011 | Silberstein et al. | |
| 9,194,811 | B1 | 11/2015 | Zhao et al. | |
| 11,356,594 | B1 * | 6/2022 | Bruguier | G02B 21/361 |
| 12,320,965 | B2 | 6/2025 | Ueda et al. | |
| 2002/0171825 | A1 | 11/2002 | Krantz et al. | |
| 2004/0061042 | A1 | 4/2004 | Almogy et al. | |
| 2011/0170090 | A1 | 7/2011 | Naftali et al. | |
| 2018/0259760 | A1 | 9/2018 | Condello et al. | |
| 2021/0404964 | A1 | 12/2021 | Schwedt et al. | |
| 2022/0350110 | A1 | 11/2022 | Aschwanden et al. | |
| 2022/0390733 | A1 | 12/2022 | Ja | |
| 2023/0098439 | A1 | 3/2023 | Darwin et al. | |
| 2023/0366823 | A1 | 11/2023 | Bishop et al. | |
| 2024/0071715 | A1 | 2/2024 | Lachmi et al. | |
| 2026/0009970 | A1 | 1/2026 | Lapid et al. | |
| 2026/0009986 | A1 | 1/2026 | Lapid et al. | |
| 2026/0009993 | A1 | 1/2026 | Lapid et al. | |

OTHER PUBLICATIONS

U.S. Appl. No. 18/762,546 , Non-Final Office Action, Mailed On Nov. 28, 2025, 18 pages.
U.S. Appl. No. 18/762,566 , Final Office Action, Mailed On Mar. 24, 2026, 18 pages.
U.S. Appl. No. 18/762,566 , Non-Final Office Action, Mailed On Oct. 10, 2025, 17 pages.
U.S. Appl. No. 18/762,546 , Notice of Allowance, Mailed On May 12, 2026, 9 pages.
U.S. Appl. No. 18/762,566 , Non-Final Office Action, Mailed On Jun. 17, 2026, 7 pages.

* cited by examiner

500

600

AUTO FOCUS SYSTEM HAVING A SPLITTER

BACKGROUND

In high throughput optical inspection systems of samples, autofocus plays a crucial role in ensuring accurate and efficient inspection processes. These inspection systems are designed to inspect samples, such as wafers or lithographic masks, for defects or anomalies at a rapid pace.

One of the key challenges in these systems is maintaining a consistent focus across large regions of the sample surface. Samples can have variations in thickness, curvature, or surface topography, which can impact the focal plane. Without autofocus capabilities, the inspection system may struggle to maintain optimal focus, leading to inaccurate or incomplete inspection results.

There is a growing need to provide an efficient and accurate auto-focus system and method.

SUMMARY

There is provided an auto-focus system and a method as illustrated in the application.

There is provided an auto-focus system that includes (a) an illumination path that is configured to illuminate a sample with illumination beams that form multiple spot arrays on the sample that includes an upstream set of spot arrays formed on a first side of an imaging area, and a downstream set of spot arrays formed on another side of the imaging area; (b) a mask that is located at an entrance pupil, the mask comprises a pair of off-axis slits for truncating each collected beam to provide a pair of rays per each collected beam; and (c) a splitter that includes (i) a first reflecting facet that is configured to direct to the first branch, first rays associated with the first collected beams, and (ii) a second reflecting facet that is oriented to the first reflecting facet and is configured to direct to the second branch, rays associated with the second collected beams; wherein the first reflecting facet and the second reflecting facet are located at a reflecting facets location that is outside an image plain, and is located in a location in which there is a separation between the first rays and the second rays.

There is provided a method for auto-focusing by an auto-focus system, the method includes (a) illuminating a sample with illumination beams that form multiple spot arrays on the sample, including an upstream set of spot arrays formed on a first side of an imaging area and a downstream set of spot arrays formed on another side of the imaging area; (b) collecting first collected beams and second collected beams from the sample; (c) truncating each collected beam using a mask located at an entrance pupil, wherein the mask comprises a pair of off-axis slits to provide a pair of rays per each collected beam; (d) directing the first rays associated with the first collected beams to the first branch using a first reflecting facet of an optical splitting element located at a reflecting facets location outside an intermediate image plane; (e) directing the rays associated with the second collected beams to the second branch using a second reflecting facet of the optical splitting element, wherein the second reflecting facet is oriented to the first reflecting facet; (f) ensuring a separation between the first rays and the second rays at the reflecting facets location; and (g) auto-focusing the system based on the collected beams in the first branch and the second branch.

BRIEF DESCRIPTION OF THE DRAWINGS

The subject matter regarded as the embodiment is particularly pointed out and distinctly claimed in the concluding portion of the specification. The embodiment, however, both as to organization and method of operation, together with specimens, features, and advantages thereof, may best be understood by reference to the following detailed description when read with the accompanying drawings in which:

Figure 1:
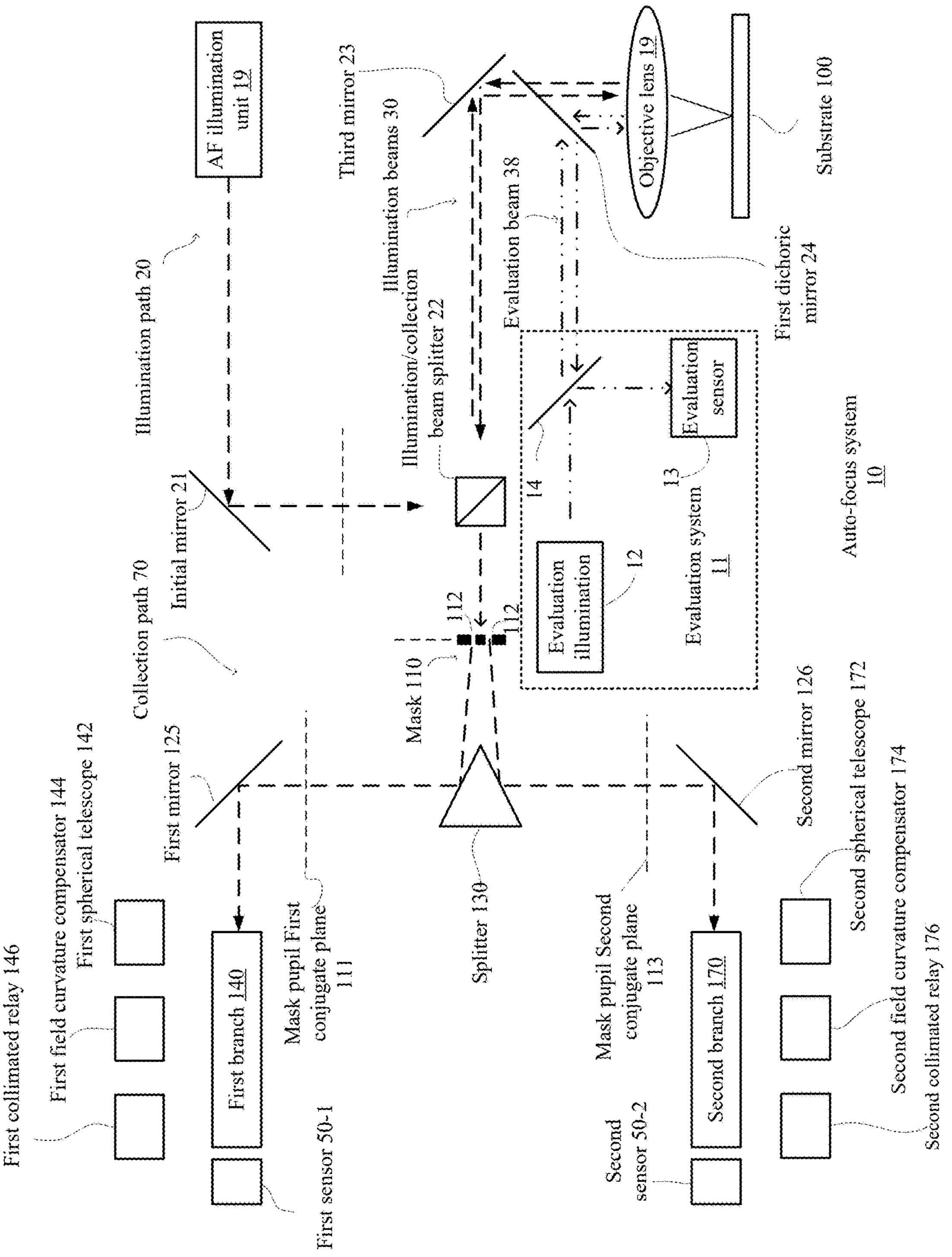
FIG. 1 illustrates an example of an auto-focus system and an associated evaluation system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Optical systems, particularly those used in large field and high numerical aperture (NA) imaging applications such as inspection tools, face significant challenges in maintaining performance while managing complexity. These systems often require the use of intricate optics to achieve the desired magnification and resolution across extensive fields of view. However, the high NA necessary for such performance typically necessitates complex optical arrangements, which can introduce distortions and reduce transmission intensity.

This is particularly problematic when the sample or sample under inspection is sensitive to the intensity and quality of the illumination.

Existing solutions to these challenges often involve the use of multiple lenses and compensatory optical elements to correct for field curvature and other aberrations. These approaches, while functional, tend to increase the complexity and sensitivity to alignment and production tolerances. Additionally, the incorporation of numerous optical components can lead to a decrease in transmission intensity due to light loss at each interface, which is especially detrimental in applications where the sample cannot tolerate high-intensity illumination—as the intensity of the illumination has to be increased in compensate for the significant loss. Furthermore, the complexity of these systems often results in a heightened susceptibility to misalignment and manufacturing variances, which can compromise the optical performance and necessitate more stringent and costly production controls.

The present system addresses these and other issues by providing a simplified optical solution that separates the fields and utilizes field splitting to achieve near-diffraction-limited spot arrays. This system includes a mask (denoted 110 in FIG. 1) with dual slits (denoted 112 in FIG. 1) that maintains the original optical axis and employs only decentered slits to preserve optical performance. By doing so, the system introduces only field curvature, which is effectively managed with a simple window-based optical path compensation technique—such first field curvature compensator 144 and second field curvature compensator 174 that are segmented optical elements (see FIG. 14). The elegance of this solution lies in the reduced complexity of the system, which allows for high-level performance with minimal sensitivity to tolerances. The system's design, which incorporates a smaller number of lenses, not only enhances transmission intensity but also improves sensitivity without risking damage to the sample.

Additionally, the system's splitter (denoted 130 in FIG. 1) operates with a common optical axis, minimizing the overlap between adjacent fields and enabling the sample to be illuminated with staggered arrays of spots. This innovative approach to autofocus and field splitting represents a significant advancement, offering a less complicated, more robust, and highly effective solution for high NA and large field imaging systems.

In the field of aerial imaging, practitioners often encounter challenges related to the limited field of view (FOV) captured by camera systems. Traditional approaches to expanding the FOV typically involve the use of multiple cameras placed adjacently to one another. This configuration aims to extract the maximum FOV from the scene while minimizing the number of optical relays required. However, such arrangements can lead to increased complexity, cost, and size of the imaging apparatus, as well as potential alignment issues between the individual camera units.

Existing solutions to enhance the FOV in aerial imaging tools often necessitate a significant number of duplicate optical components, which can be cumbersome and economically inefficient. Moreover, the use of multiple cameras to cover a larger area can introduce complications in image processing and stitching, potentially affecting the overall image quality. Additionally, the need for multiple optic relays to bring the image into focus for each camera can further complicate the system design and reduce the imaging efficiency.

The present system addresses these challenges by introducing a splitter strategically positioned near an image plane that is located downstream to the mask. The FLS effectively separates the field of view onto a wafer or mask without necessitating additional optical relays to bring the image to the camera. By exploiting the relatively small (NA) in the image space, the system minimizes the separation of field of views on the wafer or lithographic mask. The system also identifies the optimal position to split the field from the interim image, ensuring that rays are not cut, which typically requires the use of knife mirrors. This innovative approach allows for the capture of an expanded FOV with minimal duplication of optical components, thereby simplifying the imaging system's design and reducing associated costs.

According to an embodiment, there is provided an autofocus system, that includes: an illumination path that is configured to illuminate a sample with illumination beams that form multiple spot arrays on the sample that includes a first set of spot arrays formed on a first side of an imaging area, and a second set of spot arrays formed on another side of the imaging area; a sensor; a controller; a collection path that includes an entrance pupil and is configured to collect collected beams that are emitted from the sample, and focus the collected beams along a first axis while imaging the entrance pupil along a second axis to provide optically processed beams; wherein the sensor is configured to generate detection signals that represent the optically processed beams; and wherein the controller is configured to determine a focus state of an evaluation beam that impinges on imaging area.

The imaging area is provided using aerial illumination.

According to an embodiment, the controller is configured to generate an initial autofocus estimate of a future focus state of the evaluation beam obtained when the evaluated beam reaches a defined position of the first set of spot arrays.

According to an embodiment, the controller is configured to update the initial autofocus estimate in timing proximity to the reaching of the imaging area to defined position.

According to an embodiment, the first set of spot arrays includes a first spot array, a second spot array and a third spot array.

According to an embodiment, the second set of spot arrays includes a fourth spot array, a fifth spot array and a sixth spot array.

According to an embodiment, each one of the multiple of spot arrays and the first set of spot arrays is staggered along the first axis and the second axis.

According to an embodiment, each one of the spot arrays is a linear spot array.

According to an embodiment, optically processed beams form a Pair of spots per each one of the multiple spot arrays, wherein a distance between spots of each pair is indicative of a focus state associated with a corresponding spot array.

According to an embodiment, the controller is configured to ignore detection signals based on sample elements illuminated by at least a part of the illumination beams.

According to an embodiment, the controller is configured to determine at least one of a pitch angle and a roll angle of the illumination beams.

Figure 20:
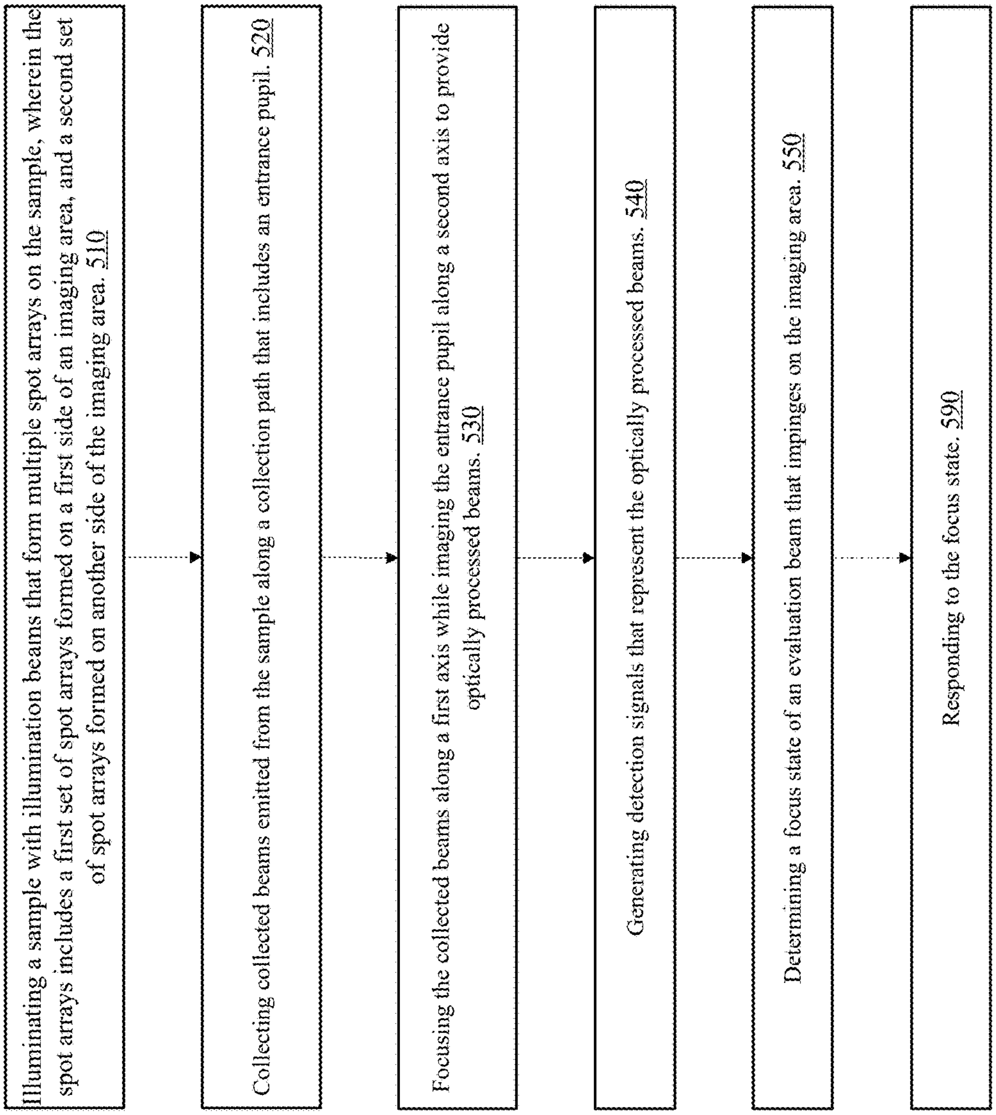
FIG. 20 illustrates an example a method.

FIG. 20 illustrates an example of method 500 for auto-focusing on an auto-focus system (10), the method includes:

a. Illuminating 510 a sample with illumination beams that form multiple spot arrays on the sample, wherein the spot arrays include a first set of spot arrays formed on a first side of an imaging area, and a second set of spot arrays formed on another side of the imaging area.
b. Collecting 520 collected beams emitted from the sample along a collection path that includes an entrance pupil.

c. Focusing 530 the collected beams along a first axis while imaging the entrance pupil along a second axis to provide optically processed beams.

d. Generating 540 detection signals that represent the optically processed beams.

e. Determining 550 a focus state of an evaluation beam that impinges on the imaging area. The detection signals indicate the focus at multiple locations on the sample—the multiple locations form a multi-dimensional array that has two or two or locations per multiple axes—and from different sides of the imaging area—thereby deducting the focus state of the evaluation beam is straight forward.

f. Responding 590 to the focus state. The responding may include changing the focus state of the evaluation system.

According to an embodiment, the method includes generating an initial auto-focus estimate of the future focus state of the evaluation beam obtained when the evaluated beam reaches a defined position of the first set of spot arrays.

According to an embodiment, the method includes updating the initial auto-focus estimate in timing proximity to the reaching of the imaging area to the defined position.

According to an embodiment, the first set of spot arrays includes a first spot array, a second spot array, and a third spot array.

According to an embodiment, the second set of spot arrays includes a fourth spot array, a fifth spot array, and a sixth spot array.

According to an embodiment, each one of the multiple spot arrays and the first set of spot arrays is staggered along the first axis and the second axis. The staggering along two axes reduces the number of splitting elements required to separate between the multiple spot arrays.

According to an embodiment, each one of the spot arrays is a linear spot array.

According to an embodiment, the optically processed beams form a pair of spots per each one of the multiple spot arrays, wherein a distance between spots of each pair is indicative of a focus state associated with a corresponding spot array.

According to an embodiment, method 500 includes ignoring detection signals based on sample elements illuminated by at least a part of the illumination beams.

According to an embodiment, step 540 includes determining at least one of a pitch angle and a roll angle of the illumination beams.

According to an embodiment, there is provided an auto-focus system, that includes:

a. An illumination path that is configured to illuminate a sample with illumination beams that form multiple spot arrays on the sample that includes a first set of spot arrays formed on one side of an imaging area, and a second set of spot arrays formed on another side of the imaging area.

b. A controller.

c. A collection path that is configured to receive first collected beams and second collected beams from the sample. The collection path includes:

i. Mask that is located at an entrance pupil, the mask includes a pair of off-axis slits for truncating each collected beam to provide a pair of rays per each collected beam.

ii. Splitter that is configured to (i) direct to the first branch, first rays associated with the first collected beams, and (ii) direct to the second branch, rays associated with the second collected beams.

iii. Sensor that follows the first branch and the second branch and is configured to receive a pair of spots per each one of the multiple spot arrays, wherein a distance between spots of each pair is indicative of a focus state associated with a corresponding spot array. An optical axis of the first branch is oriented to an optical axis of the second branch.

According to an embodiment the controller is configured to receive detection signals from at least one sensor of the first sensor—and the second sensor—and determine the focus status of the evaluation beam. According to an embodiment, the controller is configured to change the focus of the evaluation system by controlling one or more engines that set the focus of the evaluation system—for example by moving a lens or other optical component of the evaluation system, by changing the position of the evaluation system, by changing the position of the sample, and the like.

According to an embodiment, the first branch includes a first spherical telescope, a first field curvature compensator, and a first collimated relay.

According to an embodiment, the second branch includes a second spherical telescope, a second field curvature compensator, and a second collimated relay.

According to an embodiment, the first field curvature compensator differs from a lens and consists essentially of a first segmented optical element that includes segments of different refraction indexes. The first segmented optical element is located at a position in which the fields associated with the rays are very small (discrete).

According to an embodiment, the second field curvature compensator differs from a lens and consists essentially of a second segmented optical element that includes segments of different refraction indexes.

According to an embodiment, each one of the first segmented optical element and the second segmented optical element is located at a position in which the fields associated with the rays are very small.

According to an embodiment, the first rays include a pair of first center rays (denoted in FIG. 12 as 66-2, 67-2) and two pairs of first marginal rays (first pair or marginal rays (denoted in FIG. 12 as 66-1, 67-1) and second pair of marginal rays (denoted in FIG. 12 as 66-3, 67-3)). The first field curvature compensator is a first segmented optical element that consists essentially of a (i) first segment (denoted in FIG. 14 as 144-1) of a first refraction index through which the pair of first center rays propagate and (ii) a second segment (denoted in FIG. 14 as 144-2) of a second refraction index through which the two first pairs of marginal rays propagate, wherein the first refraction index differs from the second refraction index.

According to an embodiment, the second rays include a pair of second center rays (denoted in FIG. 12 as 68-2, 69-2) and two pairs of marginal rays (including a first pair of marginal rays (denoted in FIG. 12 as 68-1, 69-1) and a second pair of marginal rays (denoted in FIG. 12 as 68-3, 69-3)).

According to an embodiment, the second field curvature compensator (denoted in FIG. 14 as 174) is a second segmented optical element that consists essentially of a first segment (174-1) of a first refraction index through which the pair of second center rays (including a third pair of marginal rays 68-2 and a fourth pair of marginal rays 69-2) propagate and a second segment (denoted in FIG. 14 as 174-2) of a second refraction index through which the two pairs of marginal rays propagate, wherein the first refraction index differs from the second refraction index.

According to an embodiment, the first spherical telescope is configured to provide a demagnified image (the demagnification factor may range between six to twelve or may equal ten or may be of any other value) of the entrance pupil at a focal plane of a first spherical telescope output lens.

According to an embodiment, the second spherical telescope is configured to provide a demagnified image of the entrance pupil at a focal plane of a second spherical telescope output lens.

According to an embodiment, the first collimated relay includes a first relay input spherical lens and a first relay output spherical lens.

According to an embodiment, the second collimated relay includes a second relay input spherical lens and a second relay output spherical lens.

According to an embodiment, the auto-focus system includes a pair of first prisms located at the focal plane of the first spherical telescope output lens.

According to an embodiment, the auto-focus system includes a pair of second prisms located at the focal plane of the second spherical telescope output lens. The pair of second prisms moves the rays of the first pair of rays away from each other.

According to an embodiment, the auto-focus system includes a first collimated relay movement mechanism that is configured to change a distance between the first relay input spherical lens and the first relay output spherical lens.

According to an embodiment, the first collimated relay movement mechanism moves the first relay output spherical lens and also moves a first sensor—to maintain a distance between the first relay output spherical lens and the first sensor. According to an embodiment, the first collimated relay movement mechanism includes a first motor.

According to an embodiment, the auto-focus system includes a second collimated relay movement mechanism that is configured to change a distance between the second relay input spherical lens and the second relay output spherical lens.

According to an embodiment, the second collimated relay movement mechanism moves the second relay output spherical lens and moves a second sensor—to maintain a distance between the second relay output spherical lens and the second sensor. According to an embodiment, the second collimated relay movement mechanism includes a second motor.

According to an embodiment, different distances between the relay input spherical lens and the relay output spherical lens are associated with different tradeoffs between a dynamic range of the auto-focus system and a sensitivity of the auto-focus system. Larger dynamic ranges are associated with lower sensitivity. Different distances are associated with different effective focal lengths of the collimated relay.

According to an embodiment, different distances between the first relay input spherical lens and the first relay output spherical lens are associated with different effective focal lengths of the first collimated relay.

According to an embodiment, the first collimated relay consists essentially a first relay input spherical lens and a first relay output spherical lens.

The relay includes a relay input spherical lens and a relay output spherical lens that have imperfections or aberrations so that the optical power at different points of any of the relay spherical lenses differs from each other. The different optical powers introduce a residual optical power even along a secondary axis of any of the relay spherical lenses. According to an embodiment, a value of an optical power of a point of the relay spherical lens is related to a spatial relationship between a center of the relay spherical lens and the point. The optical power is associated with a magnification.

According to an embodiment, the first collimated relay exhibits a main optical power along a primary axis, and when receiving a skew ray (an off-axis ray)—that is oriented to the primary axis of the collimated relay and to the collimated axis of the collimated relay—the skew ray impinges on a point that is located outside the center of the relay spherical lens (an off-center point) and exhibits an optical power along both axes.

The skey-ray is skewed in part due to the non-zero angle between an optical axis formed between the mask and the splitter and to an optical axis of each one of the first branch and the second branch.

According to an embodiment, the auto-focus system includes a selectable depth of field unit that is configured to select a reference focal plane of the auto-focus system.

According to an embodiment, the selectable depth of field unit includes a first selectable depth of field unit—that is selectively positioned within the first branch or outside the first branch. According to an embodiment, the first selectable depth of field unit is a first window selectively positionable within the first spherical telescope. When positioned within the first spherical telescope the depth of field of the first branch is located at a first position, when positioned outside the first spherical telescope the depth of field of the first branch is located at a second position which differs from the second position.

According to an embodiment, the selectable depth of field unit includes a second selectable depth of field unit—that is selectively positioned within the second branch or outside the second branch. According to an embodiment, the second selectable depth of field unit is a second window selectively positionable within the second spherical telescope. When positioned within the second spherical telescope the depth of field of the second branch is located at a third position, when positioned outside the second spherical telescope the depth of field of the second branch is located at a fourth position which differs from the first position.

Figure 21:
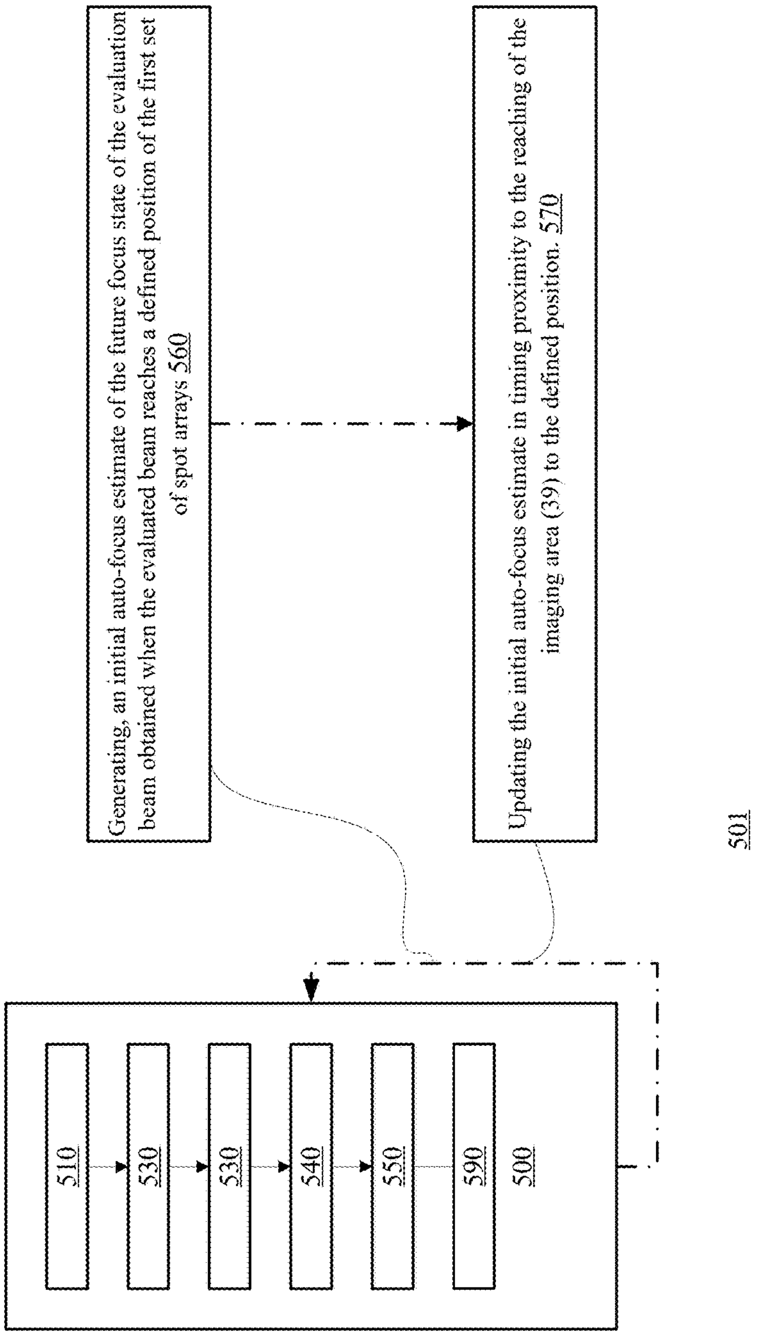
FIG. 21 illustrates an example a method.

FIG. 21 illustrates an example of method 501 for auto-focusing on an auto-focus system (10), the method includes:

a. Illuminating (510) a sample with illumination beams (30) that form multiple spot arrays (40) on the sample, wherein the spot arrays include a first set of spot arrays (42) formed on a first side of an imaging area (39), and a second set of spot arrays (44) formed on another side of the imaging area (39).
b. Collecting (520) collected beams emitted from the sample along a collection path that includes an entrance pupil.
c. Focusing (530) the collected beams along a first axis (91) while imaging the entrance pupil along a second axis (92) to provide optically processed beams.
d. Generating (540) detection signals (100) that represent the optically processed beams.
e. Determining (550) a focus state of an evaluation beam (38) that impinges on the imaging area (39).
f. Responding (590) to the focus state. The responding may include changing the focus state of the evaluation system.

According to an embodiment, steps 510-550 are repeated multiple times, at different points of time.

According to an embodiment, step 540 followed by step 560 of generating, an initial auto-focus estimate of the future focus state of the evaluation beam obtained when the evaluated beam reaches a defined position of the first set of spot arrays. Step 560 may be included in step 590.

For example—assuming that the sample is scanned so that the first set of spot arrays precedes the evaluation beam—then the initial auto-focus estimate may be based on the focus information embedded in the first set of spot arrays. The initial auto-focus estimate may equal the focus state as reflected by the first set of spot arrays—or may differ from the focus state as reflected by the first set of spot arrays.

For example—assuming that the sample is scanned so that the second set of spot arrays precedes the evaluation beam—then the initial auto-focus estimate may be based on the focus information embedded in the second set of spot arrays. The initial auto-focus estimate may equal the focus state as reflected by the second set of spot arrays—or may differ from the focus state as reflected by the second set of spot arrays.

According to an embodiment, method 501 includes step 570 of updating the initial auto-focus estimate in timing proximity to the reaching of the imaging area (39) to the defined position. Step 570 may be included in step 590.

The updating may be based on the focus state of the imaging area (or on the focus of any of the sets of sport arrays) obtained during one or more iterations of steps 510-550 that follow the iteration that provided the initial-auto-focus estimate.

Figure 2:
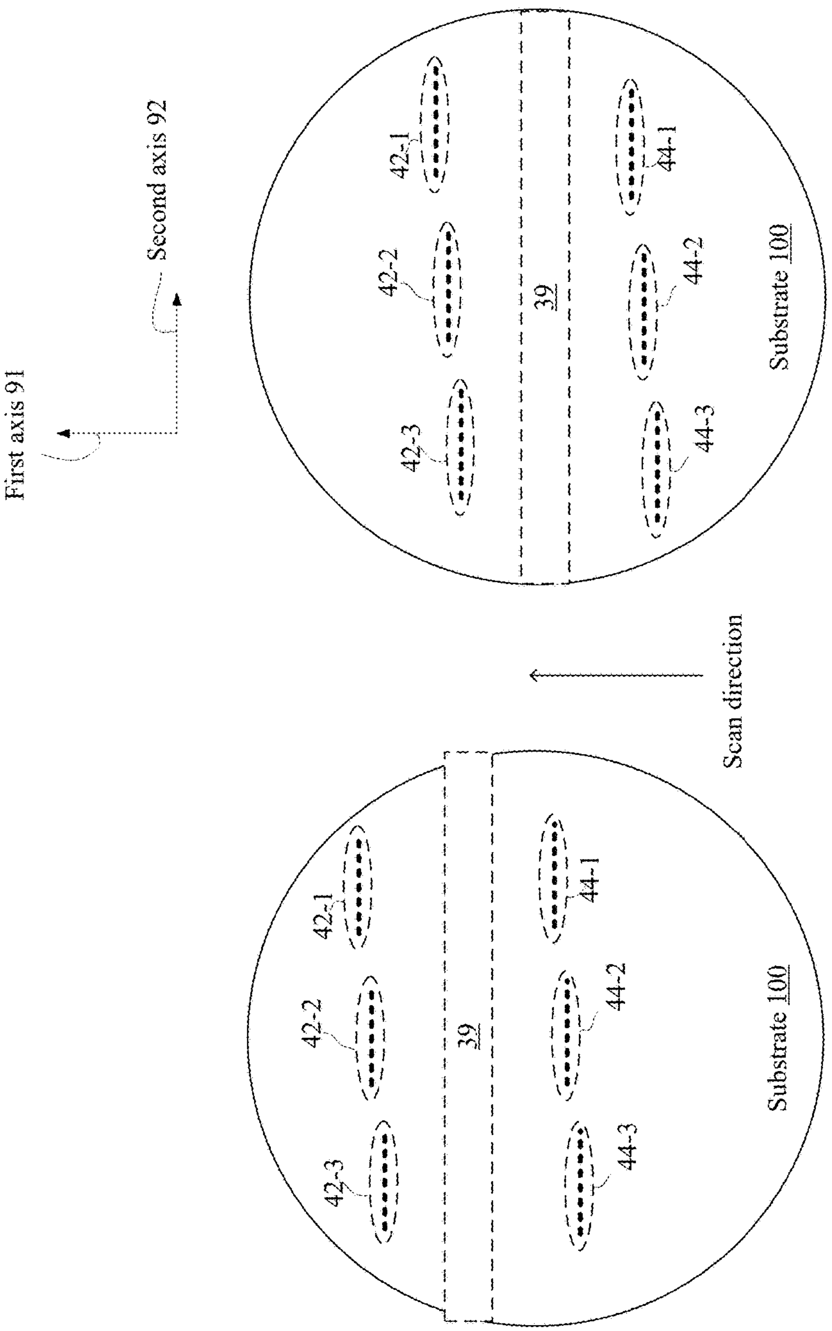
FIG. 2 illustrates an example of a sample and of spots formed on the sample.

See, for example, FIG. 2. The right part of FIG. 2 illustrates sample 99 and the first and second sets of spot arrays at a first point in time during which an initial auto-focus estimate of the focus state of imaging area 39 is made—based on the focus information focus information embedded in the first set of spot arrays. Before the imaging area 39 reaches the location (at the first point of time) of the first set of spot arrays—step 570 may update the initial auto-focus estimate. The left part of FIG. 2 illustrates the imaging area 39 as reaching the location (at the first point of time) of the first set of spot arrays.

According to an embodiment, each one of the multiple spot arrays (40) and the first set of spot arrays (42) is staggered along the first axis (91) and the second axis (92).

According to an embodiment, one, some or all spot arrays are linear spot arrays.

According to an embodiment, one, some or all spot arrays are nonlinear spot arrays.

According to an embodiment, the optically processed beams form pair of spots per each one of the multiple spot arrays, wherein a distance between spots of each pair (at a sensor plane) is indicative of a focus state associated with a corresponding spot array.

According to an embodiment, step 550 includes ignoring detection signals (100) based on sample elements illuminated by at least a part of the illumination beams (30). The ignoring may be based on design information or other type of information indicative of regions of the sample (for example highly dense logic element region) that once illuminated will provide a low signal to noise ration signals and/or diffracted signals, and the like.

According to an embodiment, step 550 includes determining at least one of a pitch angle and a roll angle of the illumination beams. Any of these angles is detectable by comparing focus information from different spot arrays.

According to an embodiment, at least one of method 500 and method 501 includes adjusting a distance between optical elements in a collection path of the evaluation system to optimize the focus state of the evaluation beam.

According to an embodiment, adjusting the distance between optical elements includes moving a lens or a mirror in the collection path of the evaluation system.

According to an embodiment, the method includes adjusting the intensity of the illumination beams used by the evaluation system to optimize the focus state of the evaluation beam.

According to an embodiment, adjusting the intensity of the illumination beams of the evaluation system includes controlling the power of a light source or adjusting the aperture of an illumination path of the evaluation system.

According to an embodiment, at least one of method 500 and method 501 includes determining a depth of field of the auto-focus system based on the focus state of the evaluation beam.

According to an embodiment, at least one of method 500 and method 501 includes adjusting the position of the imaging area based on the determined depth of field.

According to an embodiment, at least one of method 500 and method 501 includes compensating for aberrations in the collection path of to improve the focus state of the evaluation beam 38.

According to an embodiment, compensating for aberrations includes adjusting the position or shape of one or more optical elements in the collection path of the evaluation system.

According to an embodiment, at least one of method 500 and method 501 includes determining a focus metric based on the detection signals to quantify the focus state of the evaluation beam. The focus metric may be indicative of the focus along any axis, a relative focus error between beams, and the like.

According to an embodiment, step 590 includes adjusting the focus state of the evaluation beam based on the determined focus metric.

According to an embodiment, step 590 includes capturing, by an evaluation system associated with the auto-focus system, an image of the sample based on the focus state of the evaluation beam.

According to an embodiment, step 590 includes analyzing the captured image to extract information about the sample.

According to an embodiment, step 590 includes adjusting the position or orientation of the sample based on the focus state of the evaluation beam.

According to an embodiment, step 590 includes determining a focus error signal based on the detection signals (100) to provide feedback for adjusting the focus state of the evaluation beam.

According to an embodiment, step 590 includes using the focus error signal to control the position or movement of one or more optical elements of the evaluation system.

According to an embodiment, there is provided an auto-focus system (10), that includes:

a. Illumination path that is configured to illuminate a sample with illumination beams that form multiple spot arrays on the sample that includes a first set of spot arrays formed on a first side of an imaging area, and a Second set of spot arrays formed on another side of the Imaging area.

b. Controller.

c. A collection path that includes:

i. A first branch that includes a first spherical telescope, a first field curvature compensator, a pair of first prisms, and a first collimated relay that consists essentially of a first relay input spherical lens and a first relay output spherical lens.

ii. A second branch that includes a second spherical telescope, a second field curvature compensator, a pair of second prisms, and a second collimated relay that consists essentially of a second relay input spherical lens and a second relay output spherical lens;

iii. A shared module that is configured to (i) receive first collected beams and second collected beams, (ii) optically process the First collected beams to provide to the first segment, a pair of first rays per first collected beam, and (iii) optically process the second collected beams to provide to the second segment, a pair of second rays per second collected beam;

d. A sensor that follows the first branch and the second branch and is configured to generate detection signals indicative of light outputted by the first branch and of light outputted by the second branch.

According to an embodiment, the shared module includes a mask that is located at an entrance pupil, the mask includes a pair of off-axis slits for truncating each collected beam to provide a pair of rays per each collected beam.

According to an embodiment, the shared module further includes a splitter that is configured to (i) direct to the first branch, first rays associated with the first collected beams, and (ii) direct to the second branch, rays associated with the second collected beams.

According to an embodiment, the first collimated relay exhibits a main optical power along a primary axis and exhibits a residual optical power along a secondary axis.

According to an embodiment, the auto-focus system includes a selectable depth of field unit that is configured to select a reference focal plane of the auto-focus system.

According to an embodiment, the selectable depth of field unit includes a first window selectively positionable within the first spherical telescope and a second window selectively positionable within the second spherical telescope.

According to an embodiment, there is provided a system, that includes:

a. An illumination path that is configured to illuminate a sample with illumination beams that form multiple spot arrays on the sample that includes a first set of spot arrays formed on a first side of an imaging area, and a second set of spot arrays formed on another side of the imaging area.

b. A sensor.

c. Controller.

d. A collection path that is configured to receive first collected beams and second collected beams from the sample. The collection path includes:

i. A mask that is located at an entrance pupil, the mask includes a pair of off-axis slits for truncating each collected beam to provide a pair of rays per each collected beam;

ii. Splitter that includes an optical splitting element that includes (i) a first reflecting facet that is configured to direct to the first branch, first rays associated with the first collected beams, and (ii) a second reflecting facet that is oriented to the first reflecting facet and is configured to direct to the second branch, rays associated with the second collected beams. The first reflecting facet and the second reflecting facet are located at a reflecting facets location that (a) is outside an image plain, and (b) in which there is a separation between the first rays and the second rays.

According to an embodiment, the optical splitting element is a prism.

According to an embodiment, the prism is a knife-edge right angle prism.

According to an embodiment, the optical splitting element is shaped and positioned to prevent vignetting of any of the first rays and the second rays.

According to an embodiment, the optical splitting element is shaped and positioned at a furthest location from the intermediate image plane in which any of the first rays and the second rays are not cut by the prism.

According to an embodiment, the splitter includes a housing and a mechanical interface that is connected to the housing and to the optical splitting element.

According to an embodiment, the housing includes an input opening, a first rays output opening and a second rays output opening.

Figure 22:
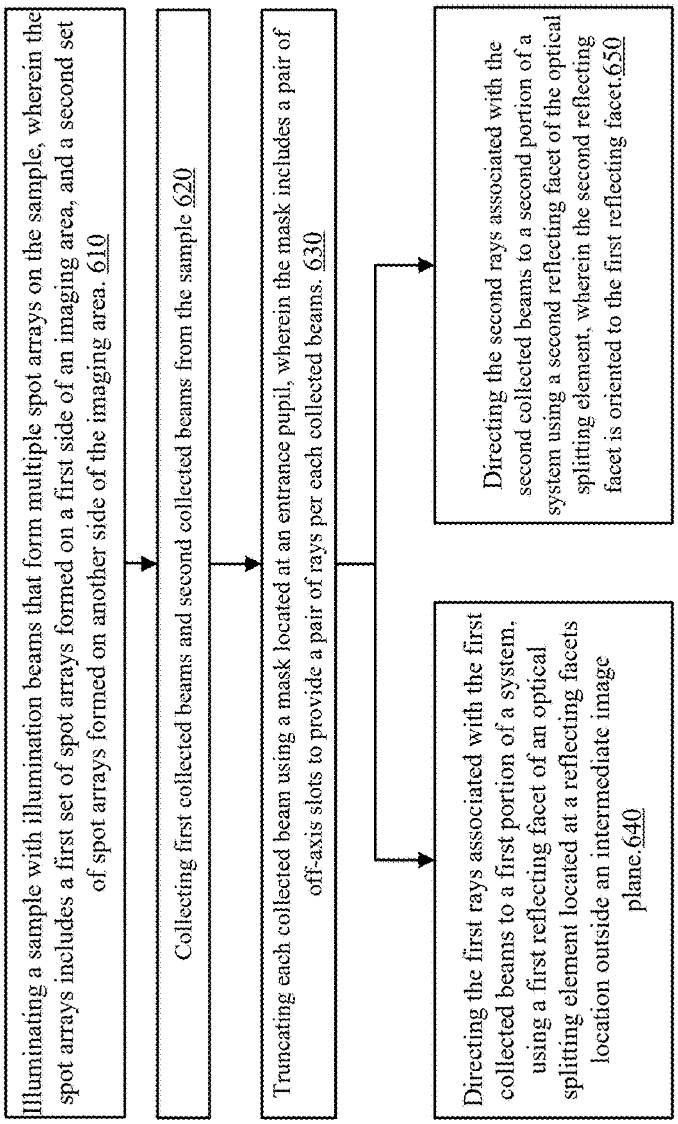
FIG. 22 illustrates an example a method.

FIG. 22 is an example of method (600) for field manipulation, the method includes:

a. Illuminating (610) a sample with illumination beams that form multiple spot arrays on the sample, including a first set of spot arrays formed on a first side of an imaging area and a second set of spot arrays formed on another side of the imaging area.

b. Collecting (620) first collected beams and second collected beams from the sample.

c. Truncating (630) each collected beam using a mask (110) located at an entrance pupil, wherein the mask (110) includes a pair of slits (112) that are off-axis slits to provide a pair of rays per each collected beam.

d. Directing (640) the first rays associated with the first collected beams to a first portion of a system, using a first reflecting facet of an optical splitting element located at a reflecting facets location outside an intermediate image plane. The first portion may be the first branch or any other portion that is not used for auto-focusing.

e. Directing (650) the second rays associated with the second collected beams to a second portion of a system using a second reflecting facet of the optical splitting element, wherein the second reflecting facet is oriented to the first reflecting facet. The second portion may be the second branch or any other portion that is not used for auto-focusing.

According to an embodiment, steps 640 and 650 are based on a separation between the first rays and the second rays at the reflecting facets location.

According to an embodiment, steps 610-650 are used for auto-focusing a measurement system.

According to an embodiment, steps 610-650 are used for purposes other than auto-focusing.

According to an embodiment, the optical splitting element is a prism.

According to an embodiment, the prism is a knife-edge right angle prism.

According to an embodiment, the method includes shaping and positioning the optical splitting element to prevent vignetting of any of the first rays and the second rays.

According to an embodiment, the method includes shaping and positioning the optical splitting element at a furthest location from the intermediate image plane in which any of the first rays and the second rays are not cut by the prism.

According to an embodiment, the method includes connecting a mechanical interface to a housing and the optical splitting element of the splitter (130).

FIG. 1 illustrates an example of auto-focus system 10 and evaluation system 11 that uses the auto-focus system 10 to maintain an evaluation beam at a desired focus position on sample 99. The evaluation system 11 includes valuation illumination 11, evaluation system beam splitter 14, and evaluation sensor 13. The evaluation system outputs an evaluation beam 38 that passes through first dichroic mirror 24, and is focused by objective lens 19 to impinge on the sample 99 to form a returned beam that is collected by objective lens 19, is directed by the first dichroic mirror 24 towards the evaluation system beam splitter 14 and then directed to the evaluation sensor 13.

The first dichroic mirror 24, and the objective lens 19 are also sued by the auto-focus system 10.

The auto-focus system 10 includes auto-focus (AF) illumination unit 19, initial mirror 21, illumination/collection beam splitter 22, third mirror 23, mask 110 (having slits 112), splitter 130, first mirror 125, first branch 140, first sensor 50-1, second mirror 126, second branch 170, and second sensor 50-2.

The first branch 140 includes a first spherical telescope 142, a first field curvature compensator 144, and a first collimated relay 146.

The second branch 170 includes second spherical telescope 172, a second field curvature compensator 174, and a second collimated relay 176.

FIG. 1 illustrates the mask pupil first conjugate plane 111 and the mask pupil first conjugate plane 113.

FIG. 2 illustrates sample 99 and multiple spot arrays at two different points in time.

The multiple spot arrays include a first set of spot arrays 42 and a second set of spot arrays 44 that are staggered along the first axis 91 and the second axis 92.

The first set of spot arrays 42 includes a first spot array 42-1, a second spot array 42-2 and a third spot array 42-3.

The second set of spot arrays 44 includes a fourth spot array 44-1, a fifth spot array 44-2 and a sixth spot array 44-3.

Figure 3:
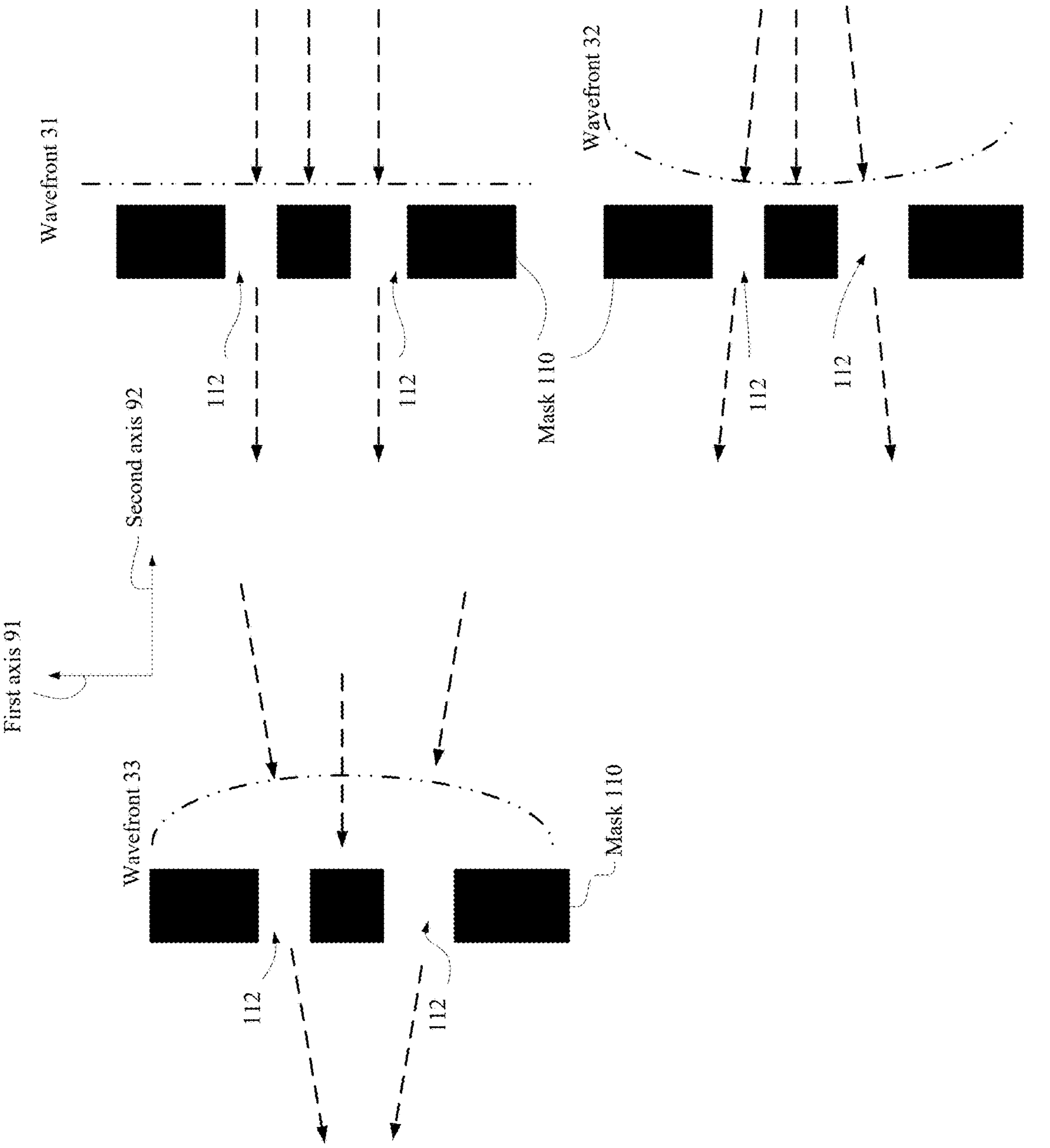
FIG. 3 illustrates an example of a mask with off-axis slits and of an impact of a wavefront on rays that exit from the mask.

FIG. 3 illustrates the relationship between a focus state of a collected beam having wavefront 31 that reaches mask 110 and the rays outputted from the slits 112 that are off-axis slits. When focused, the wavefront 31 is parallel to the mask and the rays that pass through slits are parallel to each other and normal to the mask. When unfocused, the wavefront is either convex (wavefront 32) or concave (wavefront 33) and the rays that pass through slits are oriented to each other and not normal to the mask.

Figure 4:
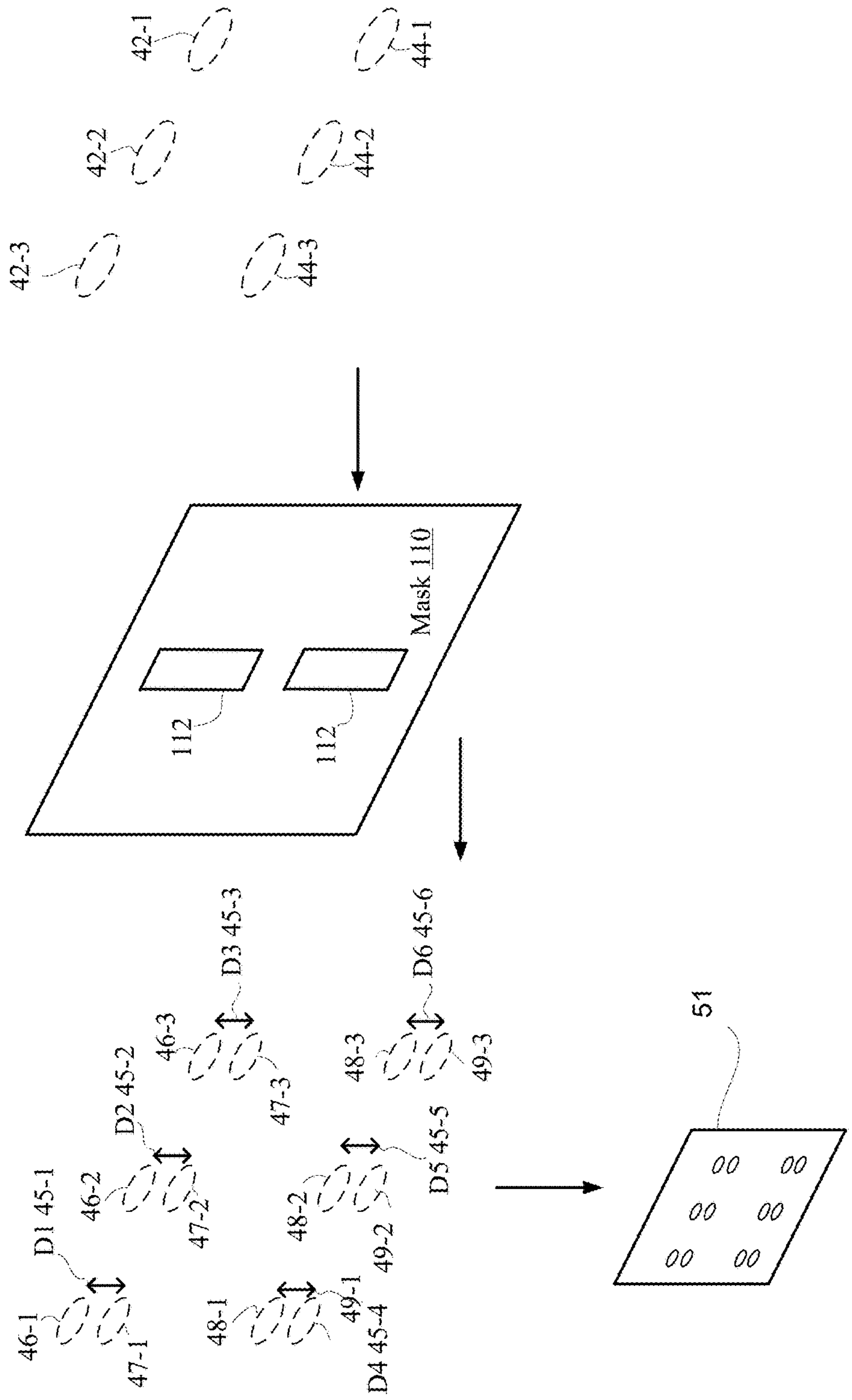
FIG. 4 illustrates an example of an optical process applied by the slits of the mask.

FIG. 4 illustrates that the slits 112 of mask 110 convert each spot array of the first set of spot arrays and of the second set of spot arrays to a pair of spaced apart rays. For values of index x between 1 and 3, spot array 42-*x* is converted to pair of rays 46-*x* and 47-*x*, and spot array 44-*x* is converted to pair of rays 48-*x* and 49-*x*.

The distance, following mask 110, between rays of a single pair of rays is indicative of the focus state related to the pair of rays. FIG. 4 illustrates first distance D1 45-1 between first rays 46-1 and 47-1, second distance D2 45-2 between second rays 46-2 and 47-2, third distance D3 45-3 between third rays 46-3 and 47-3, fourth distance D4 45-4 between fourth rays 48-1 and 49-1, fifth distance D5 45-5 between fifth rays 48-2 and 49-2, and sixth distance D6 45-6 between sixth rays 48-3 and 49-3.

FIG. 4 also illustrates a demagnified image 51 of the entrance pupil at a focal plane of a first spherical telescope output lens.

Figure 5:
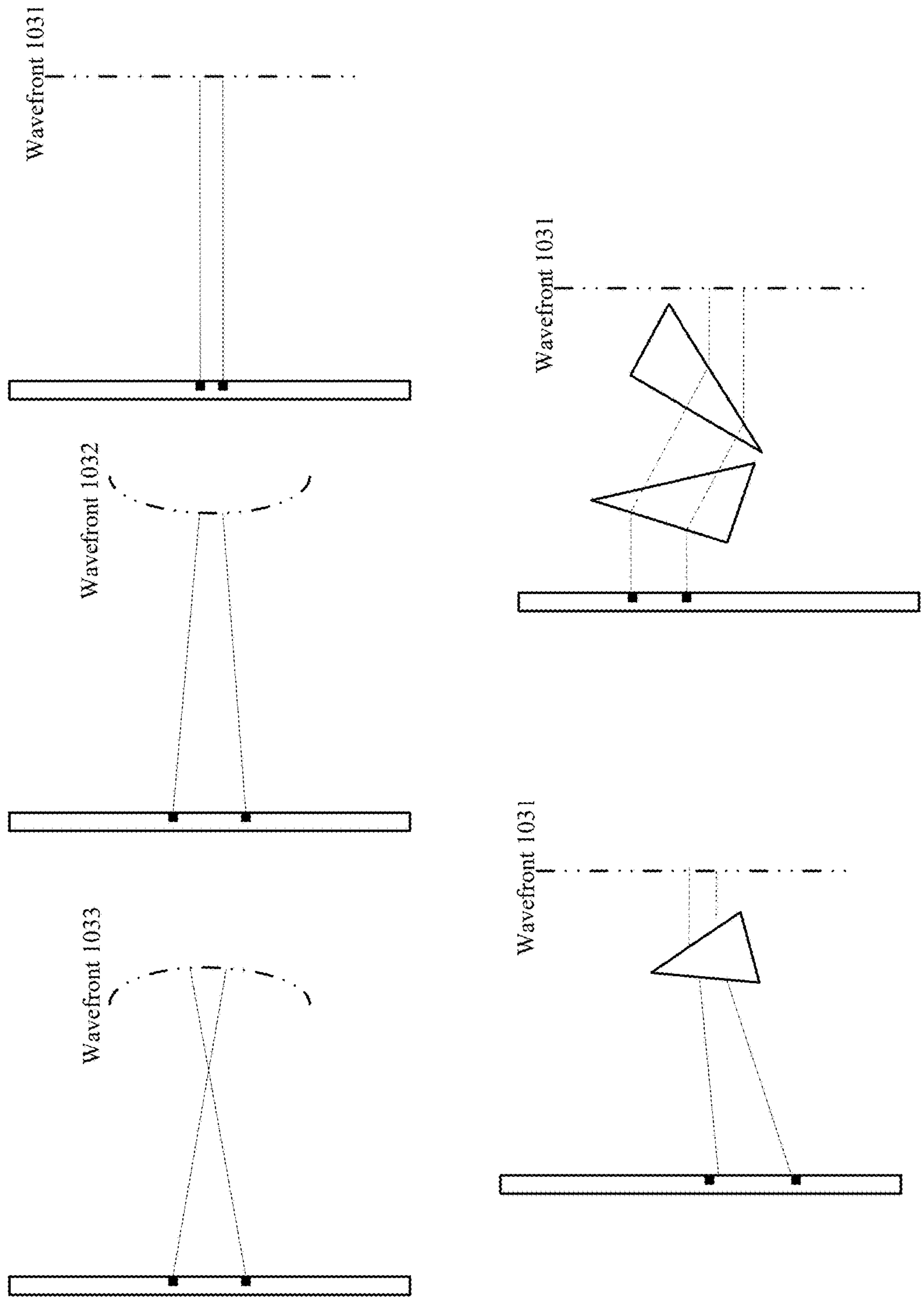
FIG. 5 illustrates an example of distance based focus sensing.

FIG. 5 illustrates the impact of the wavefront of a ray at the focal plane of a spherical telescope output lens-on how the rays are sensed by a sensor.

The focus stage should be determined based on the distance between the rays that impinge on the sensor. The distance can provide a clear indication of the focus state when the wavefront 1031 is parallel to the sensor. The distance can be ambiguous when the wavefront 1032 is concave or convex 1033—depending on the location of a focal point associated with the ray. In order to resolve the ambiguity—the rays of the pair of rays are spaced apart from each other—by using one prism or a pair of prisms.

FIGS. 6-8 and 9-18 illustrate the auto-focus system or components of the auto-focus system having fixed collimating relays. FIG. 9 illustrates the auto-focus system with collimated relay movement mechanisms that are configured to change the distance between relay input spherical lens and relay output spherical lens of the collimated relays. According to an embodiment, any auto-focus system of FIGS. 6-8 and 9-18 includes the collimated relay movement mechanisms.

Figure 6:
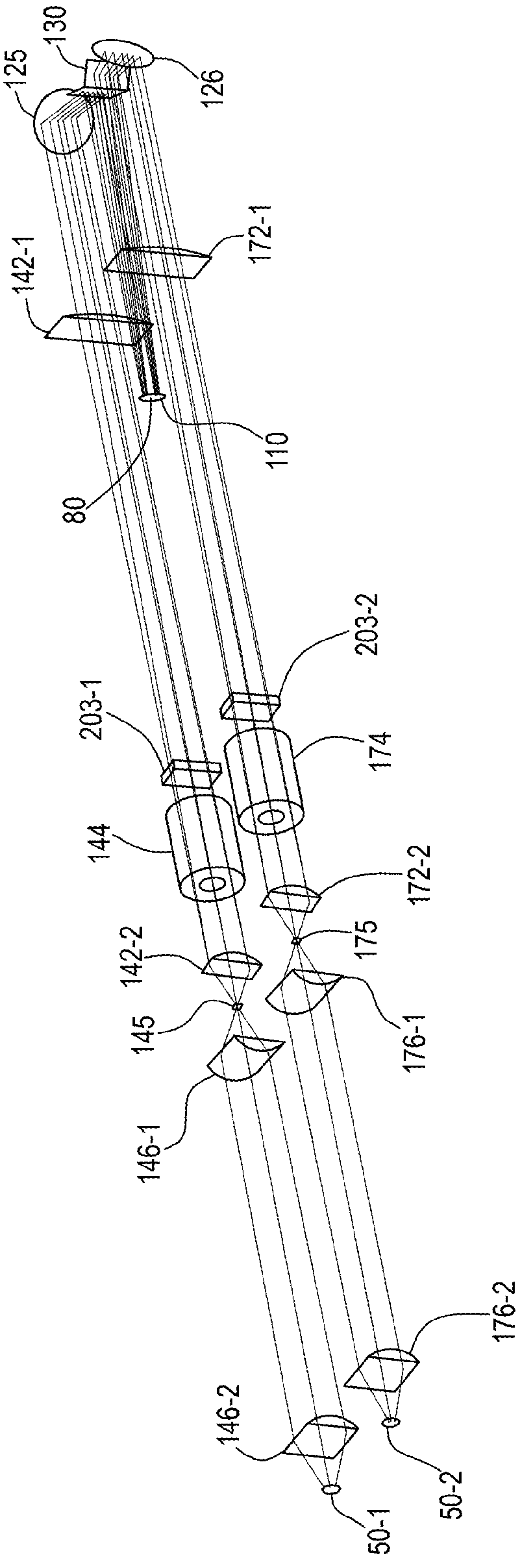
FIG. 6 illustrates an example of at least some components of an auto-focus system.
Figure 7:
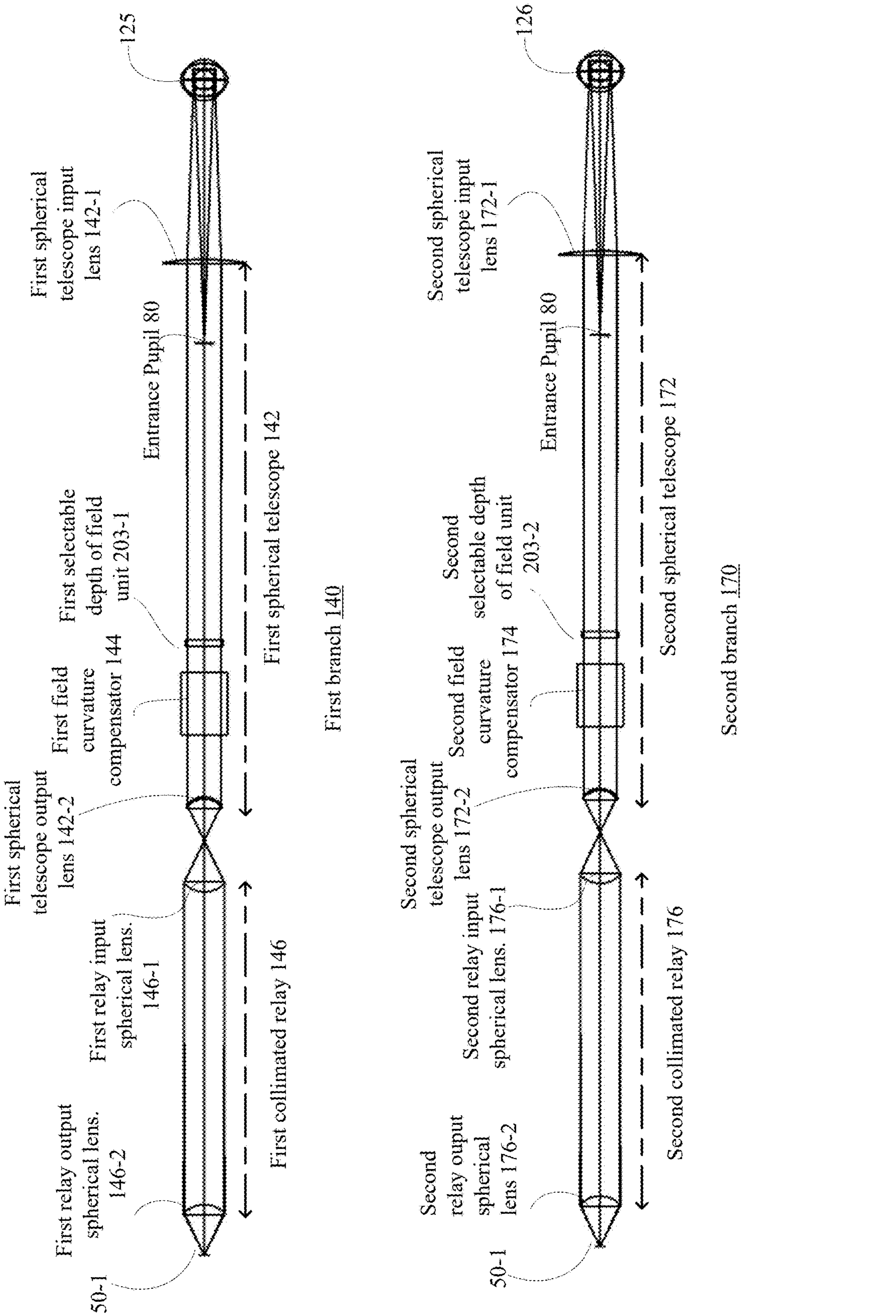
FIG. 7 illustrates an example of at least some components of an auto-focus system.

FIGS. 6 and 7 illustrate the auto-focus system as including entrance pupil 80, mask 110, splitter 130, first mirror 125, second mirror 126, first spherical telescope input lens 142-1, first selectable depth of field unit 203-1, first field curvature compensator 144, first spherical telescope output lens 142-2, first prisms 145, first relay input spherical lens 146-1, first relay output spherical lens 146-1, first sensor 50-1, second spherical telescope input lens 172-1, second selectable depth of field unit 203-2, second field curvature compensator 174, second spherical telescope output lens 172-2, second prisms 175, second relay input spherical lens 176-1, second relay output spherical lens 176-1, second sensor 50-2.

Figure 8:
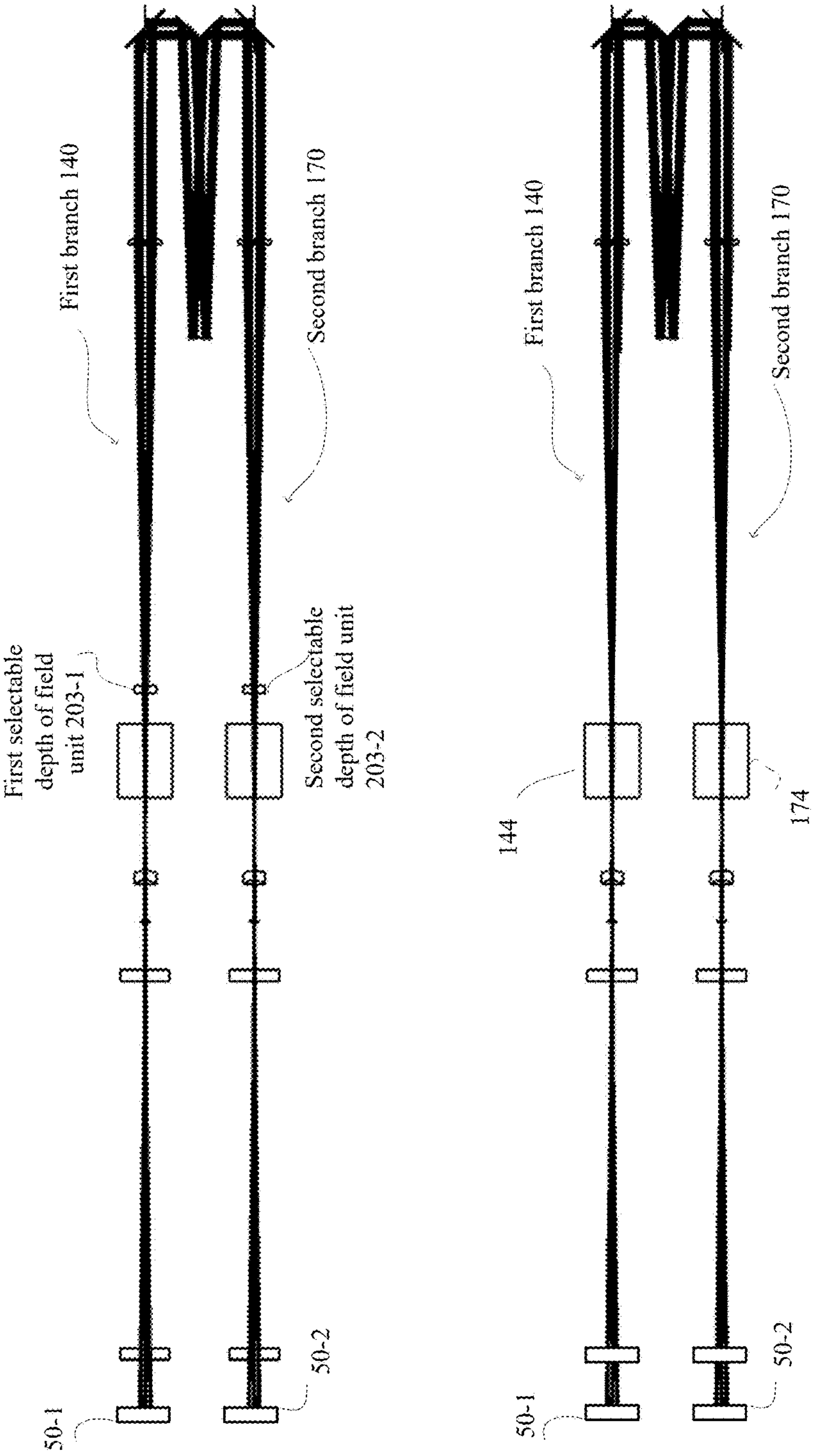
FIG. 8 illustrates an example of at least some components of an auto-focus system.
Figure 9:
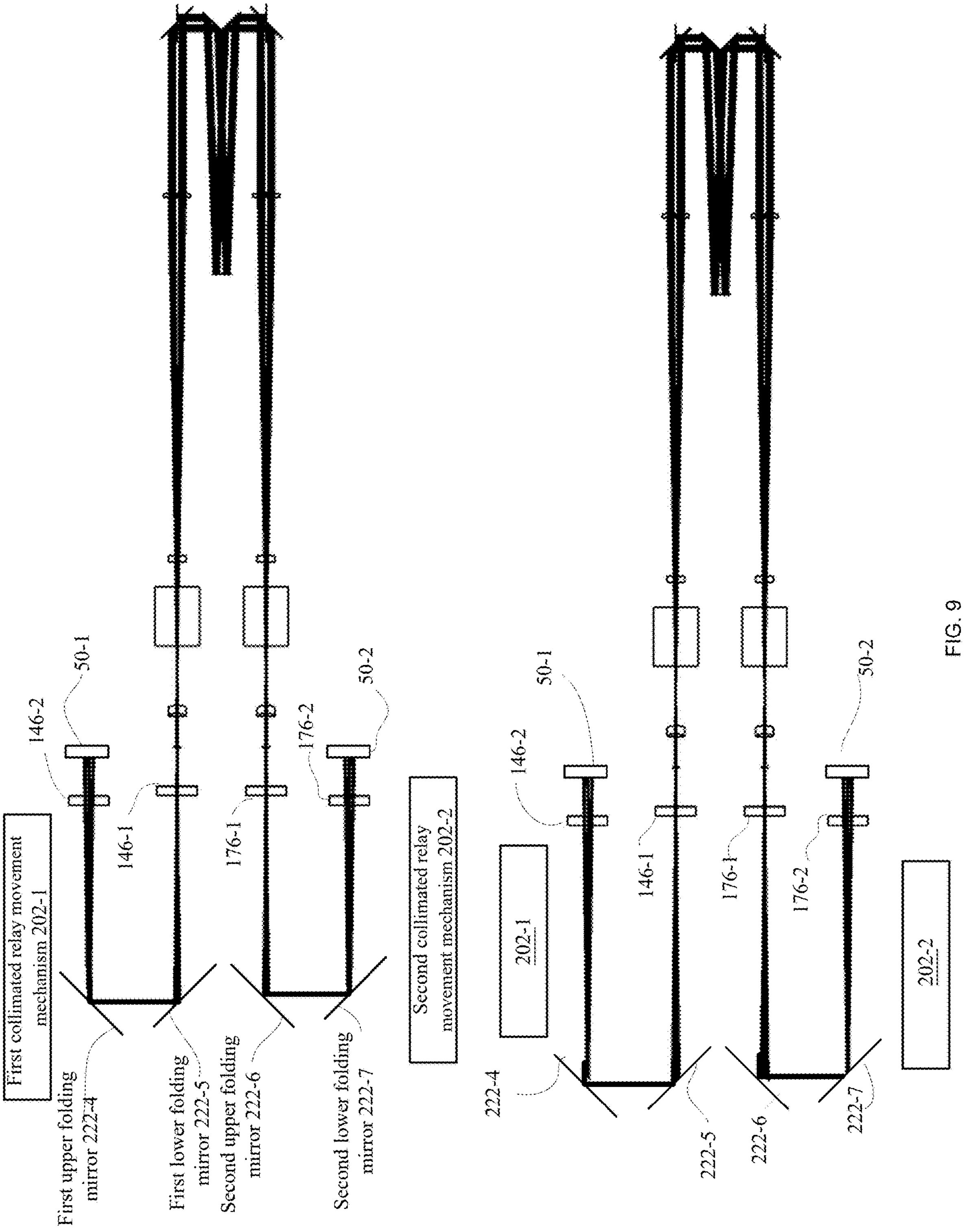
FIG. 9 illustrates an example of at least some components of an auto-focus system.

The top part of FIG. 8 illustrates the auto-focus system having the first selectable depth of field unit 203-1 within the first branch 140 and having the second selectable depth of field unit 203-2 within the second branch 170.

The bottom part of FIG. 8 illustrates the auto-focus system having the first selectable depth of field unit 203-1 outside the first branch 140 and having the second selectable depth of field unit 203-2 outside the second branch 170.

The depth of focus is determined by moving the second selectable depth of field unit and the first selectable depth of field unit—while other optical components of the first branch and of the second branch maintain static—which increases the accuracy of the auto-focus system.

FIG. 9 illustrates the auto-focus system at two points in time—and at two different distances between the lenses of the collimated relay.

The auto-focus system includes:

a. First lower folding mirror 222-5 and first upper folding mirror 222-4 that are located between the first relay input spherical lens 146-1 and the first relay output spherical lens 146-2.
b. Second upper folding mirror 222-6 and second lower folding mirror 222-7 that are located between the second relay input spherical lens 176-1 and the second relay output spherical lens 176-2.
c. First collimated relay movement mechanism 202-1 that is configured to change a distance between the first relay input spherical lens 146-1 and the first relay output spherical lens 146-2.
d. Second collimated relay movement mechanism 202-2 that is configured to change a distance between the second relay input spherical lens 176-1 and the second relay output spherical lens 176-2.

The auto-focus system of FIG. 8 allows a continuous change of the effective focal length of the collimated relay.

Figure 10:
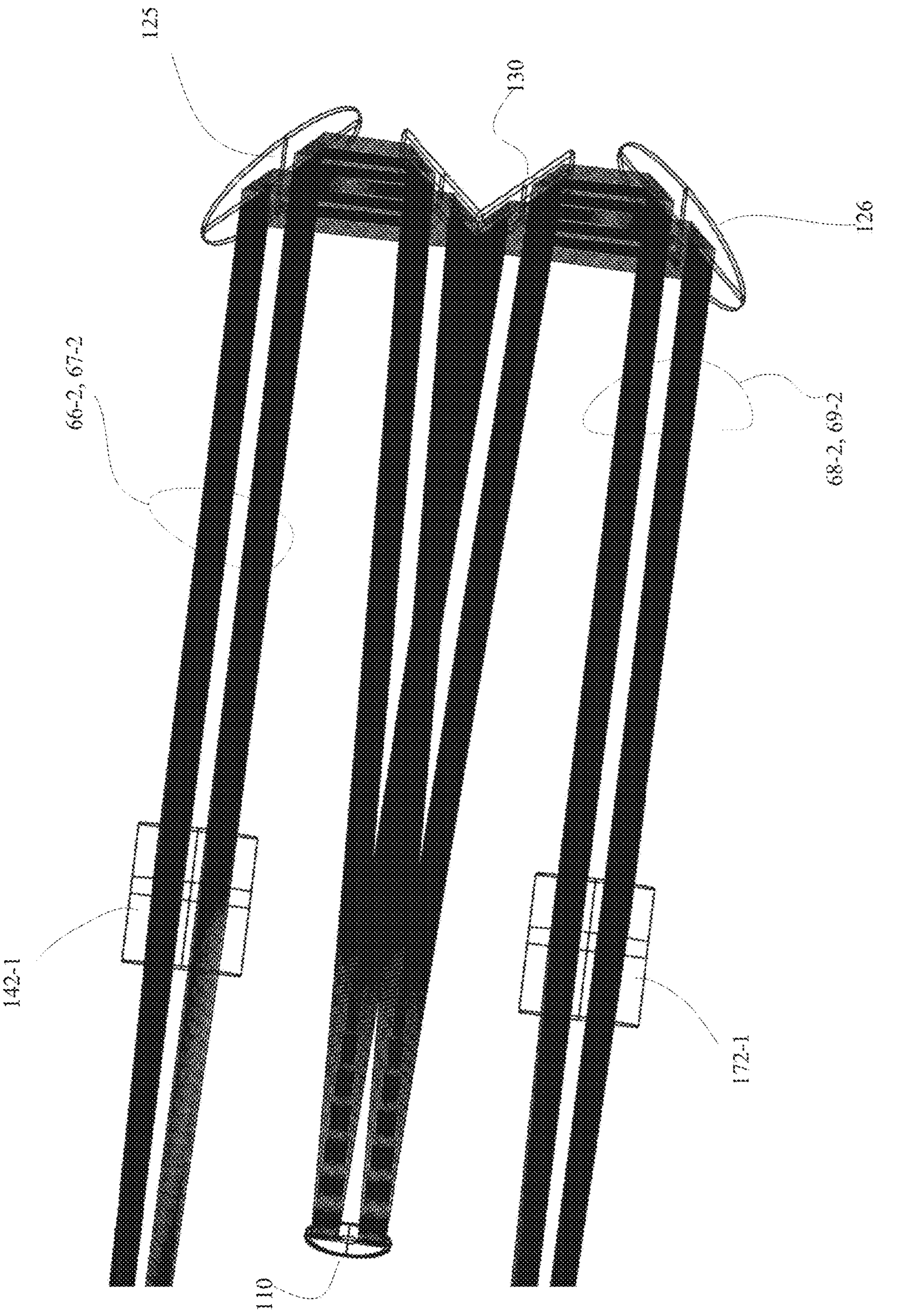
FIG. 10 illustrates an example of at least some components of an auto-focus system.
Figure 11:
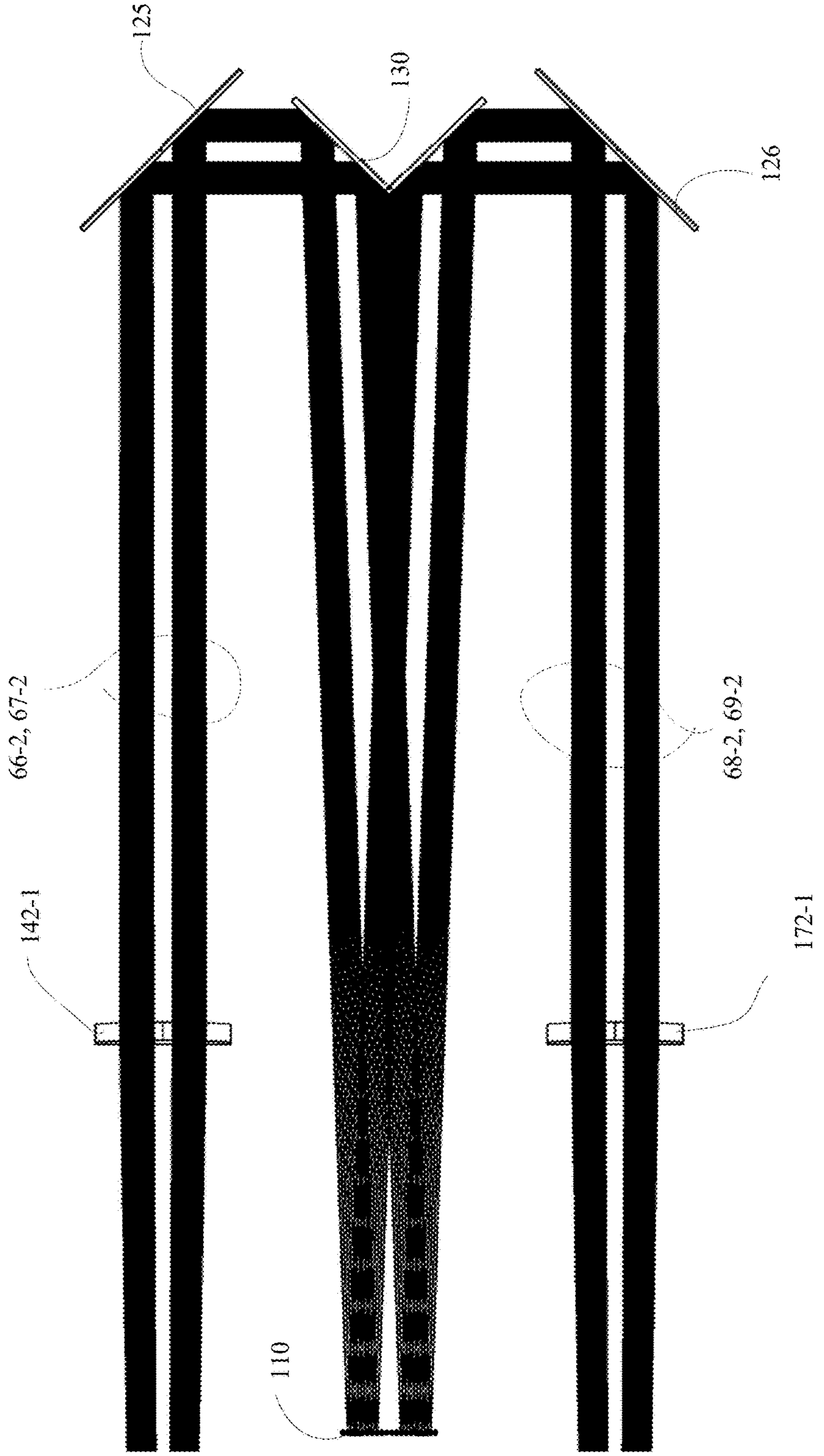
FIG. 11 illustrates an example of at least some components of an auto-focus system.

FIGS. 10 and 11 illustrate an example of mask 110, first mirror 125, second mirror 126, first spherical telescope input lens 142-1, and second spherical telescope input lens 172-1, a separation of two pairs of rays by splitter 130, a deflection of pair of rays 66-2 and 67-2 by first mirror 125, and a deflection of pair of rays 68-2 and 69-2 by second mirror 126.

Figure 12:
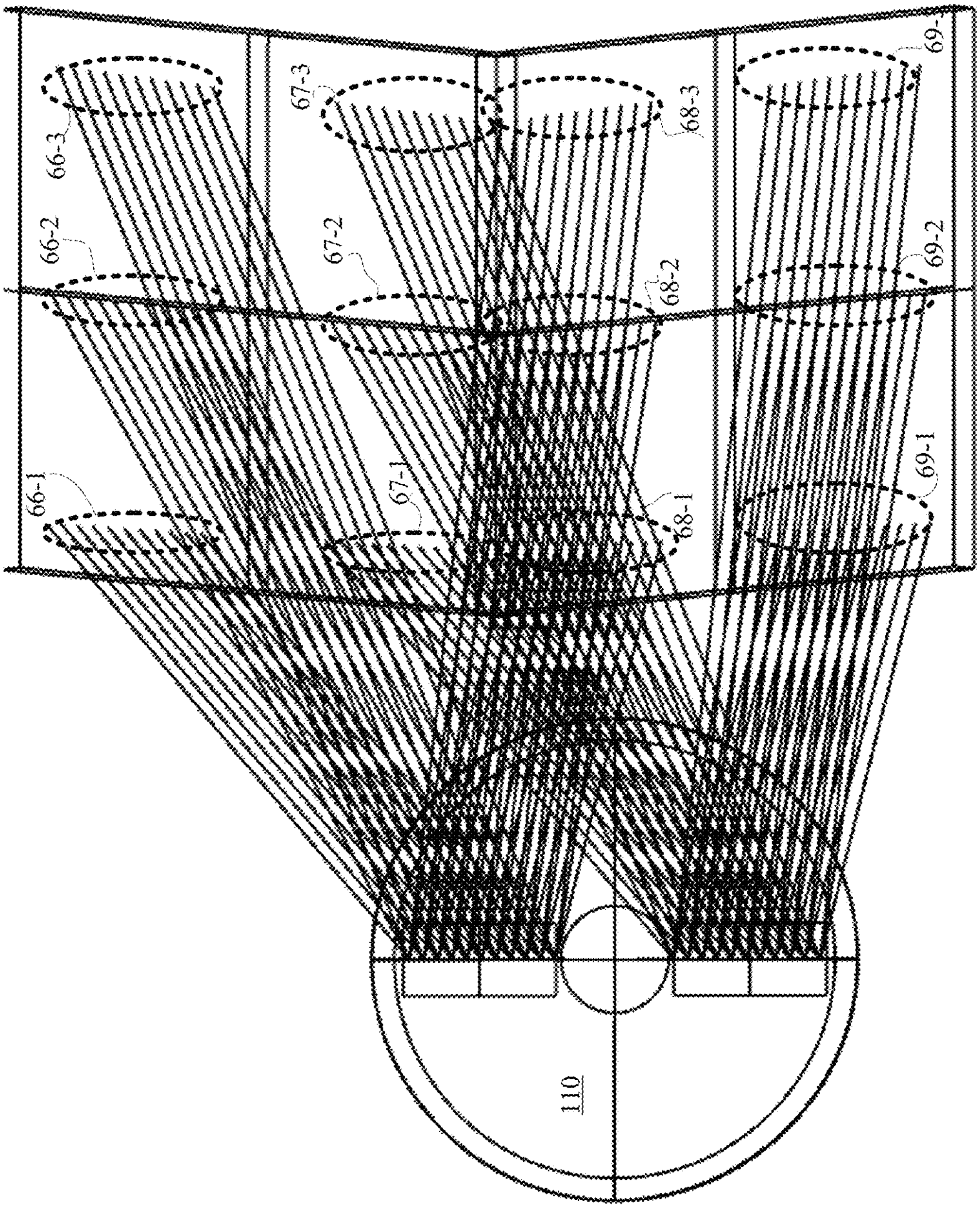
FIG. 12 illustrates an example of at least some components of an auto-focus system.

FIG. 12 illustrates that the slits 112 of mask 110 convert each spot array of the first set of spot arrays and of the second set of spot arrays to a pair of spaced apart rays and the splitter spots formed on splitter 130. For values of index x between 1 and 3, spot array 42-*x* is converted to pair of rays that form splitter spots 66-*x* and 67-*x*, and spot array 44-*x* is converted to pair of rays that form splitter spots 68-*x* and 69-*x*.

Figure 13:
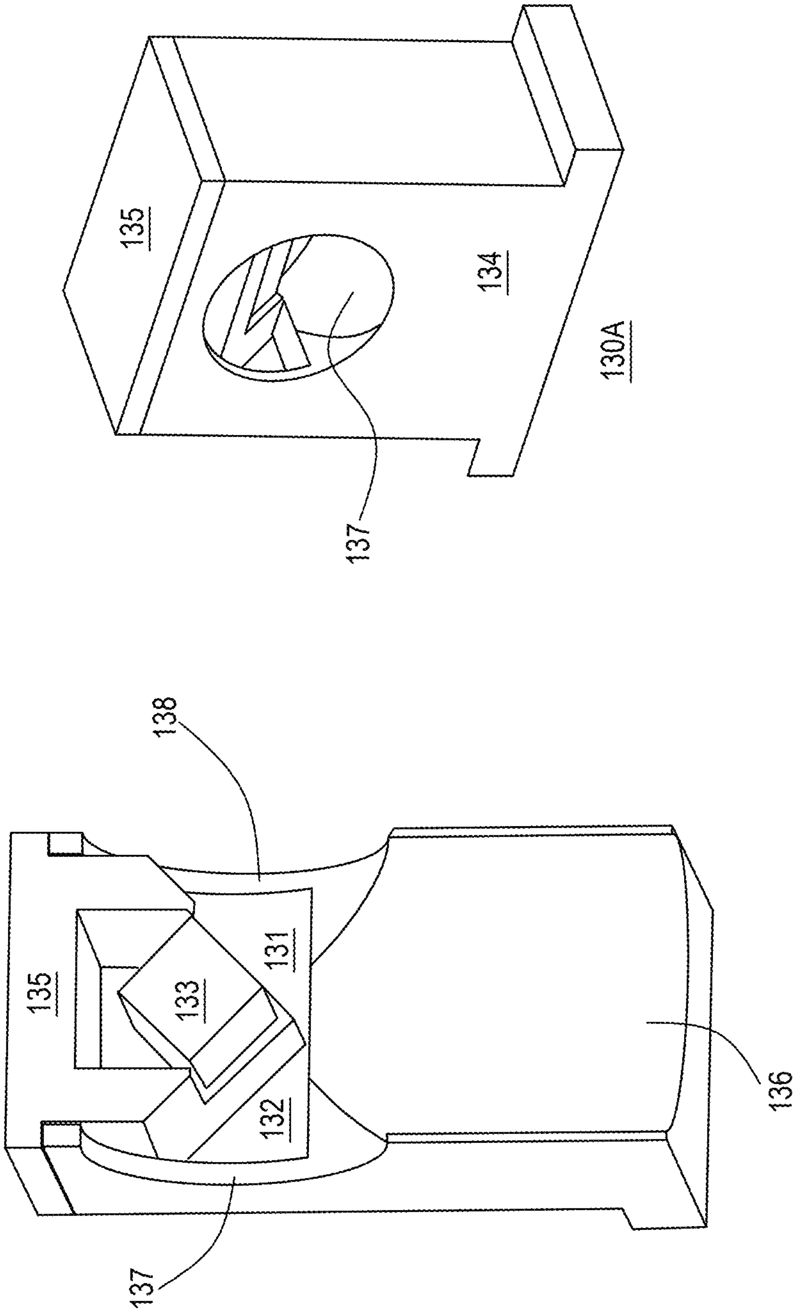
FIG. 13 illustrates an example of a splitter.

FIG. 13 illustrates splitter 130A that includes an optical splitting element (such as prism 133) that includes first reflecting facet 131 and a second reflecting facet 132. Splitter 130A also includes housing 134 and mechanical interface. The housing includes housing top 135, input opening 136, first rays output opening 137, and second rays output opening 138.

Figure 14:
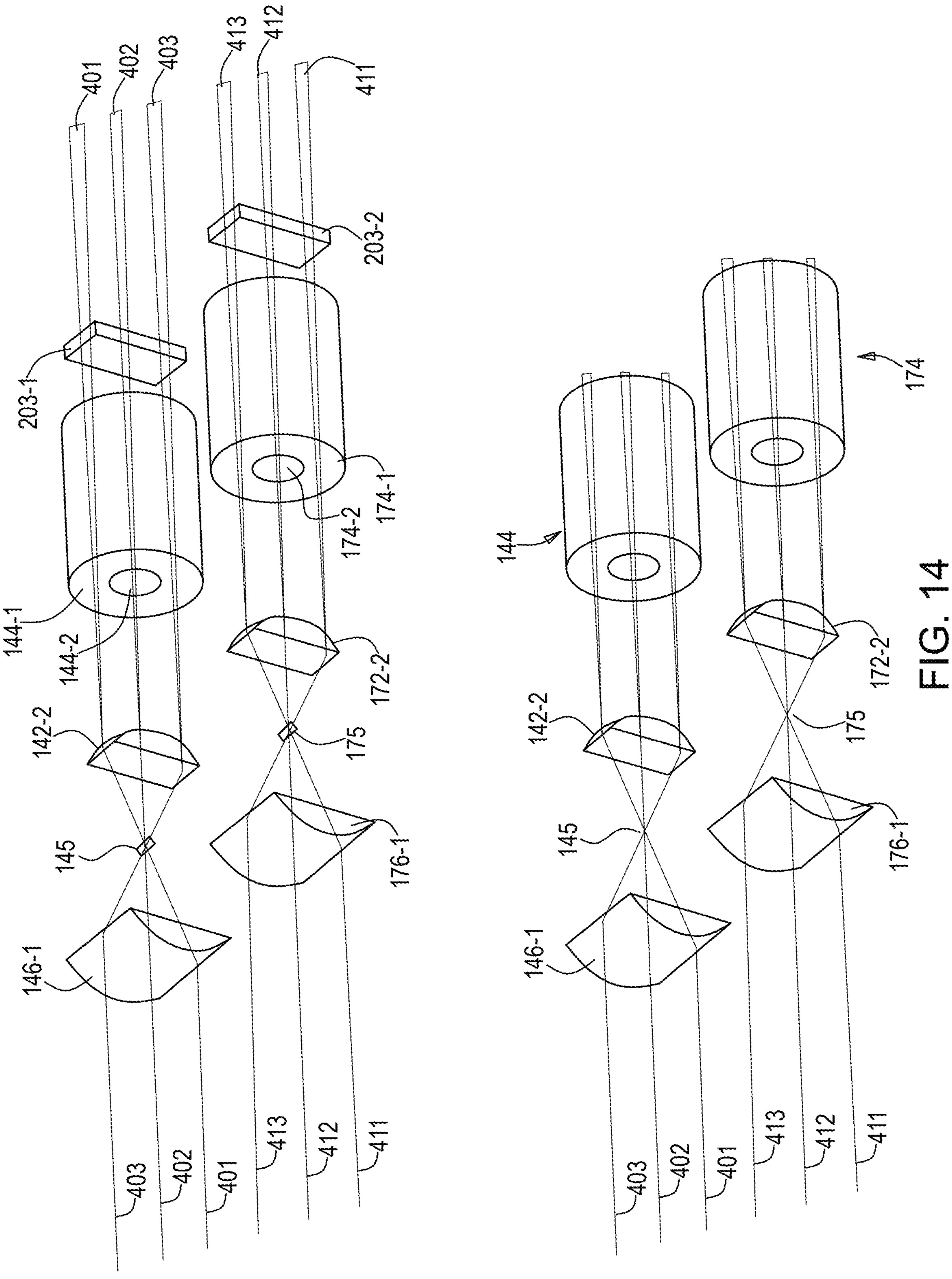
FIG. 14 illustrates an example of at least some components of an auto-focus system.
Figure 15:
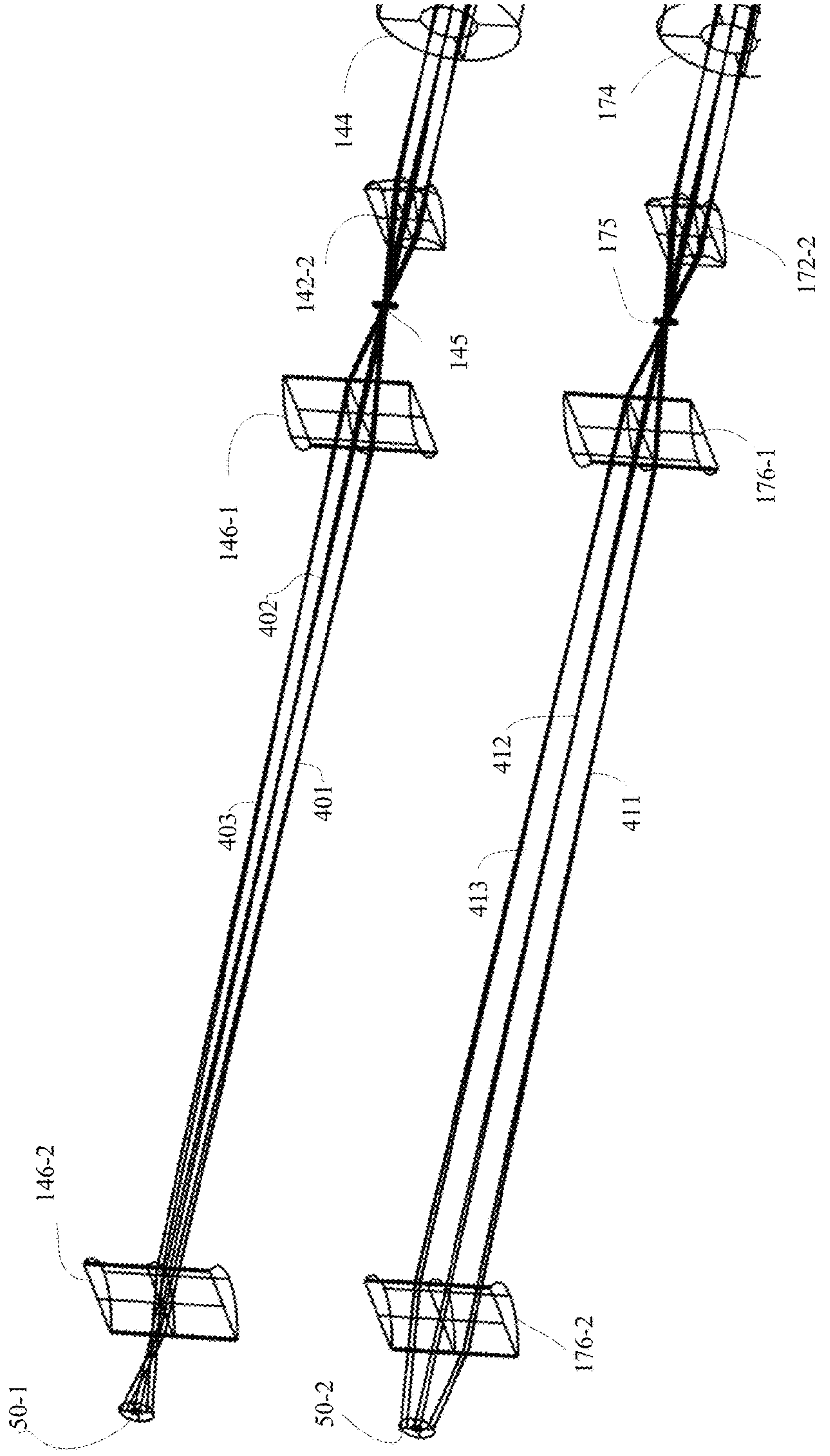
FIG. 15 illustrates an example of at least some components of an auto-focus system.

FIGS. 14 and 15 illustrate the optical processing of pairs of rays by various components of the first branch and of the second branch.

In FIG. 14 the various components include first spherical telescope input lens 142-1, first selectable depth of field unit 203-1, first field curvature compensator that include a first segment 144-1 and a second segment 144-2, first spherical telescope output lens 142-2, first prisms 145, and first relay input spherical lens 146-1, second spherical telescope input lens 172-1, second selectable depth of field unit 203-2, second field curvature compensator 174 that includes third segment 174-1 and fourth segment 174-2, second spherical telescope output lens 172-2, second prisms 175, second relay input spherical lens 176-1.

In FIG. 15 the various components include first field curvature compensator 144, first spherical telescope output lens 142-2, first prisms 145, first relay input spherical lens 146-1, first relay output spherical lens 146-1, first sensor 50-1, second field curvature compensator 174, second spherical telescope output lens 172-2, second prisms 175, second relay input spherical lens 176-1, second relay output spherical lens 176-1 and second sensor 50-2.

FIGS. 14 and 15 illustrates a first pair 401 of rays (that includes first rays 46-1 and 47-1 of FIG. 4), a second pair 402 of rays (that includes second rays 46-2 and 47-2 of FIG. 4), a third pair 403 of rays (that includes third rays 46-3 and 47-3 of FIG. 4), a fourth pair 411 of rays (that includes fourth rays 48-1 and 49-1 of FIG. 4), a fifth pair 412 of rays (that includes fifth rays 48-2 and 49-2 of FIG. 4), and a sixth pair 413 of rays (that includes sixth rays 48-3 and 49-3 of FIG. 4).

Figure 16:
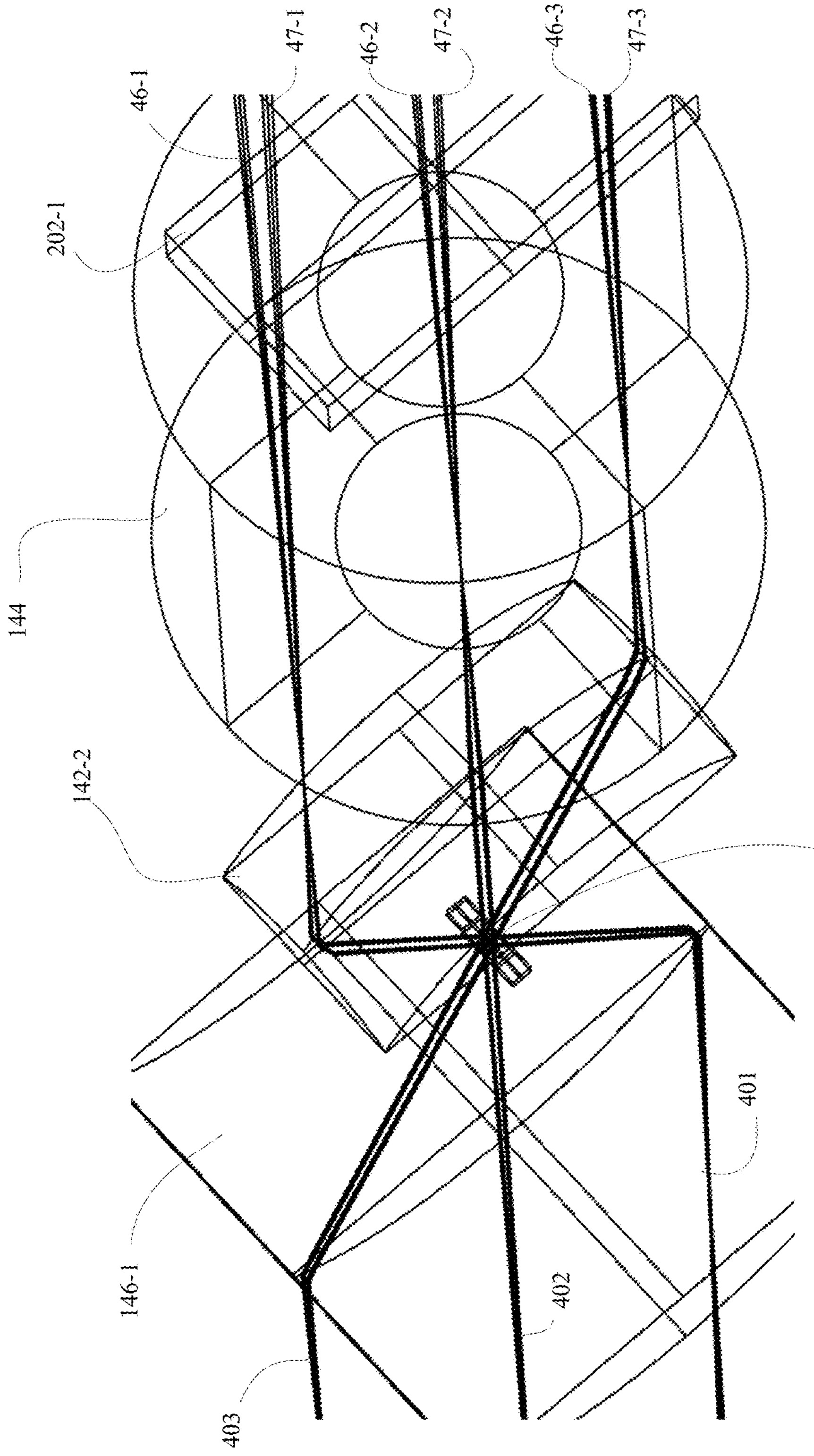
FIG. 16 illustrates an example of at least some components of an auto-focus system.

FIG. 16 illustrates the optical processing of pairs of rays by various components of the first branch and of the second branch.

The various components include first selectable depth of field unit 203-1, first field curvature compensator 144, first spherical telescope output lens 142-2, first prisms 145, and first relay input spherical lens 146-1.

FIG. 16 illustrates first rays 46-1 and 47-1, first pair 401 of rays, second rays 46-2 and 47-2, second pair 402 of rays, third rays 46-3 and 47-3 and third pair 403 of rays.

Figure 17:
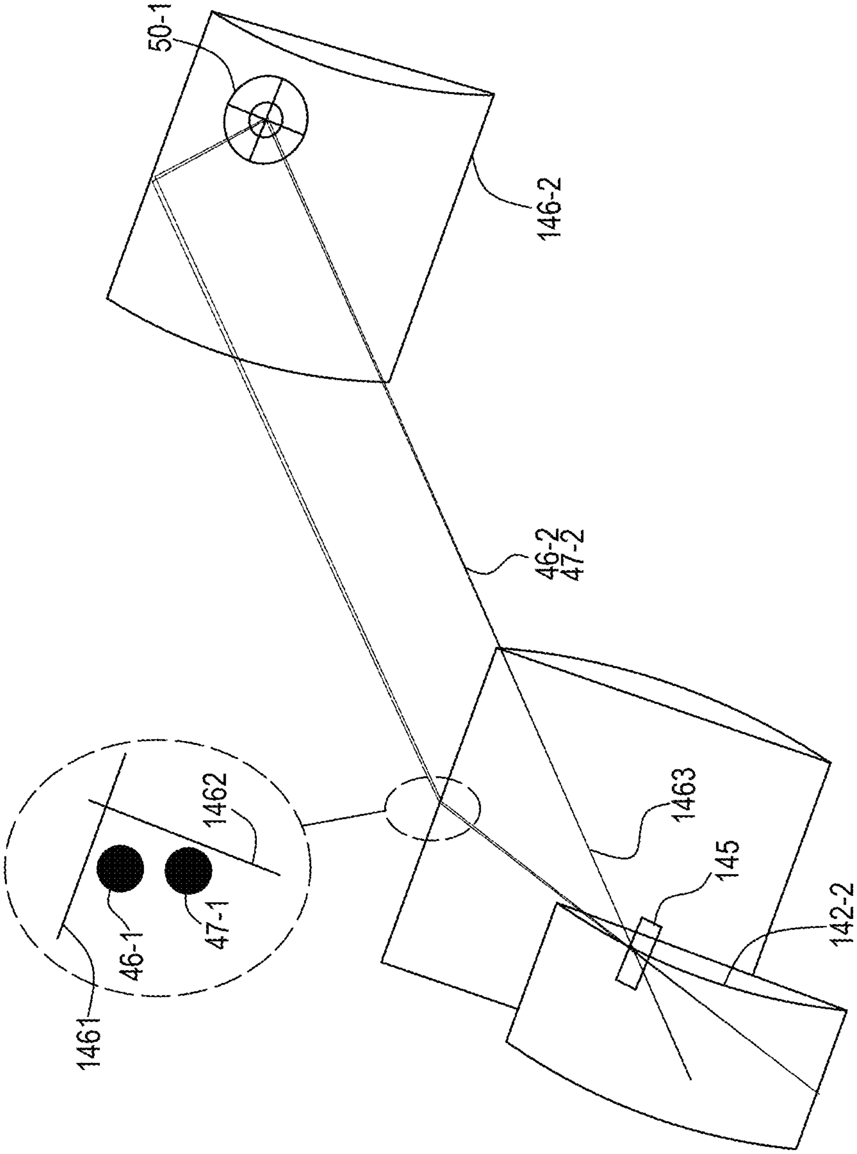
FIG. 17 illustrates an example of at least some components of an auto-focus system.

FIG. 17 illustrates the optical processing of pairs of rays by various components of the first branch and of the second branch.

The various components include first spherical telescope output lens 142-2, first prisms 145, first relay input spherical lens 146-1 and first relay output spherical lens 146-2. Virtual line 1463 illustrates the propagation of second rays 46-2 and 47-2.

FIG. 17 illustrates first rays 46-1 and 47-1. The first rays are located on a virtual line that is oriented to the primary axis 1462 of the collimated relay and are oriented to the secondary axis 1461 of the collimated relay and are subjected to the main optical power of the collimated relay.

Figure 18:
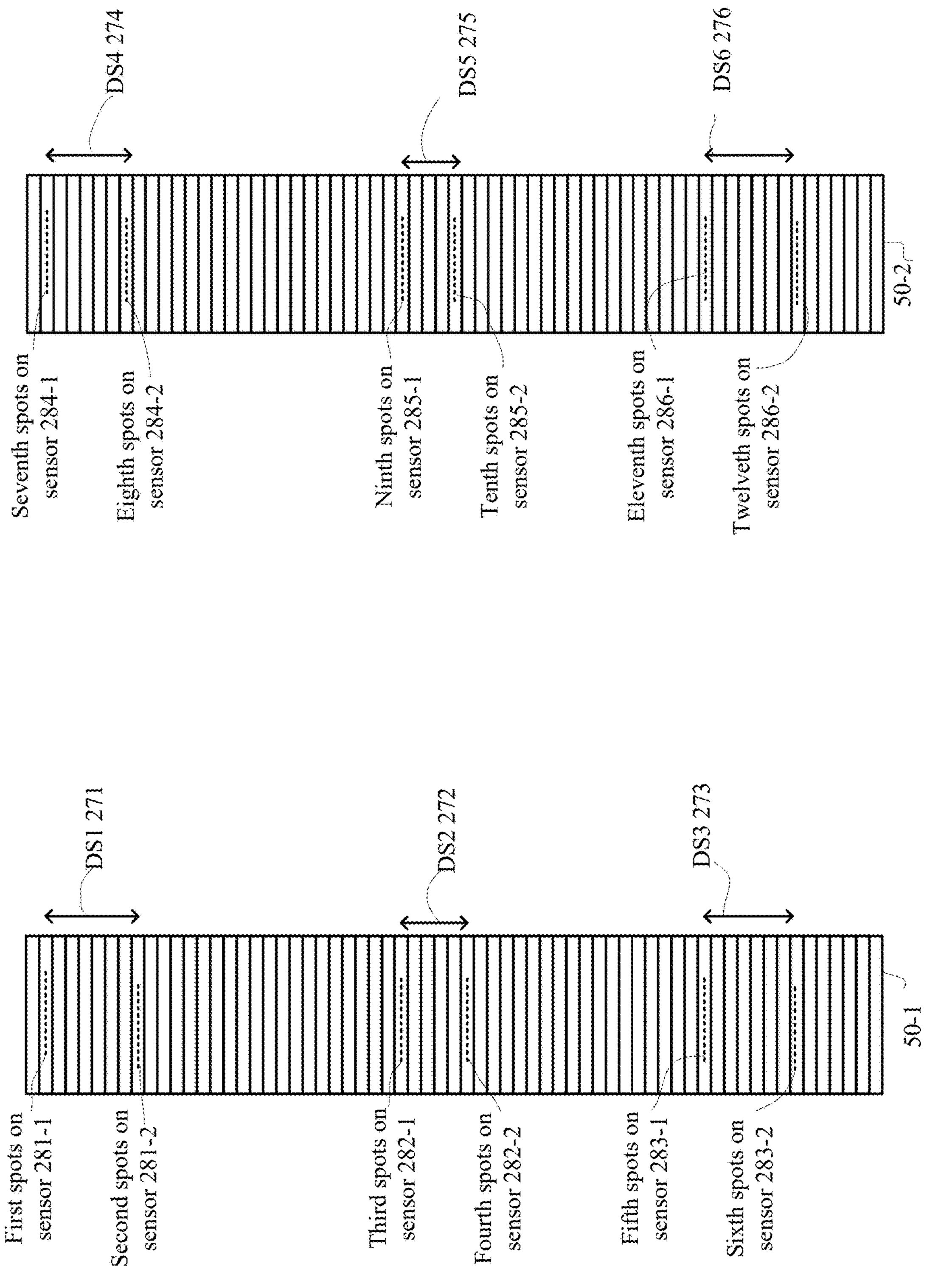
FIG. 18 illustrates an example of spots that are formed on sensors.

FIG. 18 illustrates the impingement of spots of the pairs of rays on the first sensor 50-1 and on the second sensor 50-2.

The first pair of rays 66-1 and 67-1 form first spots 281-1 and second spots 281-2 on a first pair of pixels of first sensor 50-1 that are spaced apart by first sensor distance DS1 271.

The second pair of rays 66-2 and 67-2 form third spots 282-1 and fourth spots 282-2 on a second pair of pixels of first sensor 50-1 that are spaced apart by second sensor distance DS2 272.

The third pair of rays 66-3 and 67-3 form fifth spots 283-1 and sixth spots 283-2 on a third pair of pixels of first sensor 50-1 that are spaced apart by third sensor distance DS3 273.

The fourth pair of rays 68-1 and 69-1 form seventh spots 284-1 and eighth spots 284-2 on a fourth pair of pixels of second sensor 50-2 that are spaced apart by fourth sensor distance DS4 274.

The fifth pair of rays 68-2 and 69-2 form ninth spots 285-1 and tenth spots 285-2 on a fifth pair of pixels of second sensor 50-2 that are spaced apart by fifth sensor distance DS5 275.

The sixth pair of rays 68-3 and 69-3 form eleventh spots 286-1 and twelfth spots 286-2 on a sixth pair of pixels of second sensor 50-2 that are spaced apart by sixth sensor distance DS6 276.

The sensor distances are indicative of the status of focus.

Figure 19:
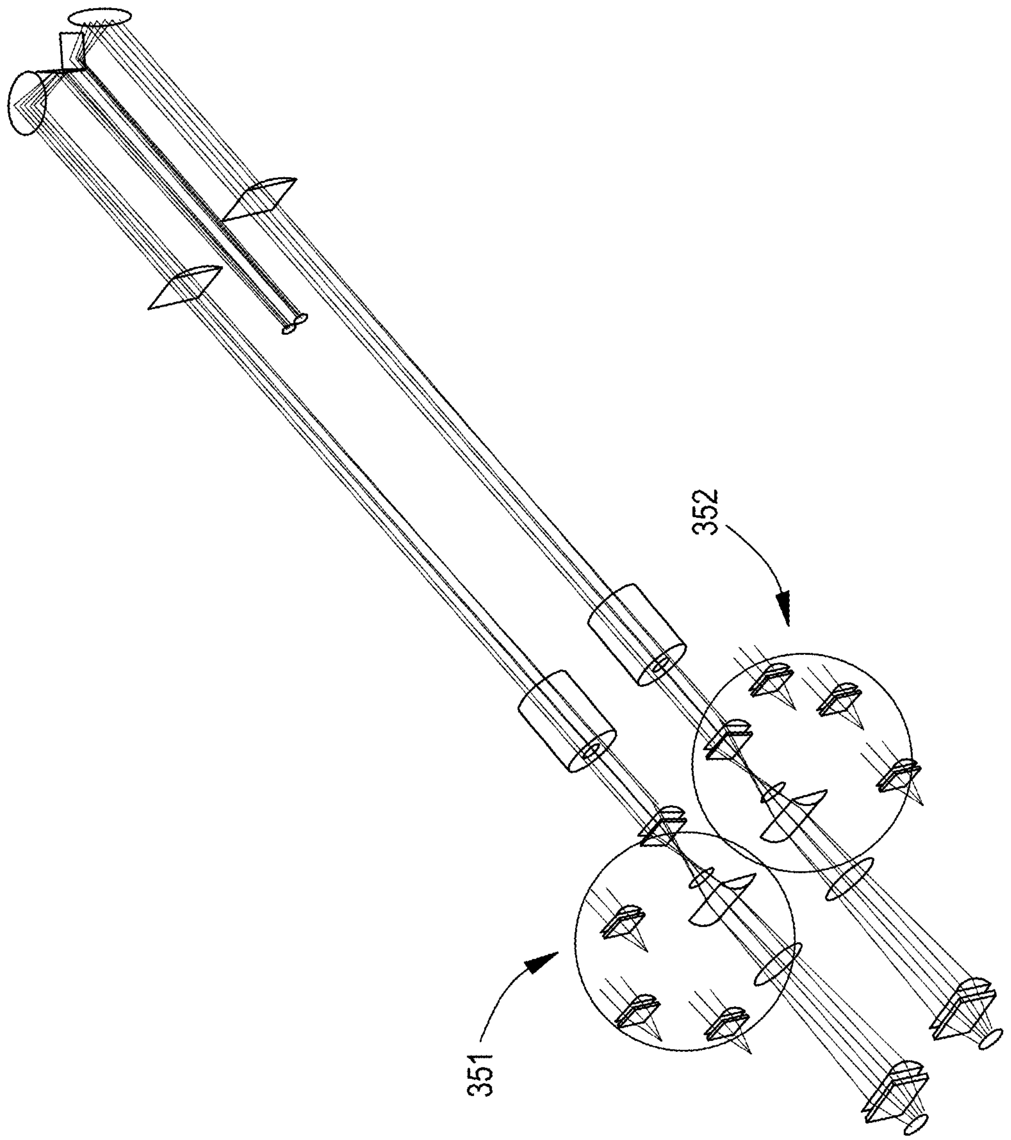
FIG. 19 illustrates an example of at least some components of an auto-focus system.

FIG. 19 illustrates an example of an auto-focus system that includes:

a. A first turret with a set of first spherical telescope output lens (collectively denoted 351) that differ from each other by focal length—to provide different sensitivities of the auto-focus system.

b. A second turret with a set of second spherical telescope output lens (collectively denoted 352) that differ from each other by focal length—to provide different sensitivities of the auto-focus system.

Any reference to a sensor should be applied to either one of a first sensor and a second sensor.

Any reference to a ray should be applied mutatis mutandis to a beam.

Any reference to a ray should be applied mutatis mutandis to a spot formed by the ray.

Any reference to a beam should be applied mutatis mutandis to a ray.

Any reference to a beam should be applied mutatis mutandis to a spot formed by the beam.

In the foregoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using optical components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively. For example, A and/or B means only A, or only B or A and B.

In the foregoing description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top,", "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Any reference to the term "comprising" or "having" or "including" should be applied mutatis mutandis to "consisting of" and/or should be applied mutatis mutandis to "consisting essentially of".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiment.

We claim:

1. An auto-focus system, comprising:

an illumination path that is configured to illuminate a sample with illumination beams that form multiple spot arrays on the sample, the multiple spot arrays comprising an upstream set of spot arrays formed on a first side of an imaging area, and a downstream set of spot arrays formed on another side of the imaging area;

a sensor;

a controller;

a collection path that is configured to receive first collected beams and second collected beams from the sample; wherein the collection path comprises:

a mask that is located at an entrance pupil, the mask comprising a pair of off-axis slits for truncating each collected beam to provide a pair of rays per each collected beam; and a splitter located downstream of the mask that comprises a optical splitting element that comprises (i) a first reflecting facet that is configured to direct to a first branch, first rays associated with the first collected beams, and (ii) a second reflecting facet that is oriented to the first reflecting facet and is configured to direct to a second branch, second rays associated with the second collected beams; wherein the first reflecting facet and the second reflecting facet are located at a reflecting facets location that (a) is outside an image plane, and (b) in which there is a separation between the first rays and the second rays.

2. The auto-focus system according to claim 1, wherein the optical splitting element is a prism.

3. The auto-focus system according to claim 2, wherein the prism is a knife-edge right angle prism.

4. The auto-focus system according to claim 1, wherein the optical splitting element is shaped and positioned to prevent vignetting of any of the first rays and the second rays.

5. The auto-focus system according to claim 1, wherein the optical splitting element is a prism and is shaped and positioned at a furthest location from an intermediate image plane in which any of the first rays and the second rays are not cut by the prism.

6. The auto-focus system according to claim 1, wherein the splitter comprises a housing and a mechanical interface that is connected to the housing and to the optical splitting element.

7. The auto-focus system according to claim 6, wherein the housing comprises an input opening, a first rays output opening and a second rays output opening.

8. A method for auto-focusing by an auto-focus system, the method comprising:

illuminating a sample with illumination beams that form multiple spot arrays on the sample, including an upstream set of spot arrays formed on a first side of an imaging area and a downstream set of spot arrays formed on another side of the imaging area;

collecting first collected beams and second collected beams from the sample;

truncating each collected beam using a mask located at an entrance pupil, wherein the mask comprises a pair of off-axis slits to provide a pair of rays per each collected beam;

directing first rays associated with the first collected beams to a first branch using a first reflecting facet of an optical splitting element located downstream of the mask and at a reflecting facets location outside an intermediate image plane;

directing second rays associated with the second collected beams to a second branch using a second reflecting facet of the optical splitting element, wherein the second reflecting facet is oriented to the first reflecting facet;

ensuring a separation between the first rays and the second rays at the reflecting facets location; and auto-focusing the auto-focus system based on the collected beams in the first branch and the second branch.

9. The method according to claim 8, wherein the optical splitting element is a prism.

10. The method according to claim 9, wherein the prism is a knife-edge right angle prism.

11. The method according to claim 9, further comprising shaping and positioning the optical splitting element to prevent vignetting of any of the first rays and the second rays.

12. The method according to claim 9, further comprising shaping and positioning the optical splitting element at a furthest location from the intermediate image plane in which any of the first rays and the second rays are not cut by the prism.

13. The method according to claim 12, further comprising connecting a mechanical interface to a housing and the optical splitting element.

14. The method according to claim 13, wherein the housing comprises an input opening, a first rays output opening, and a second rays output opening.

* * * * *